United States Patent
Kekki et al.

(10) Patent No.: US 10,261,669 B2
(45) Date of Patent: Apr. 16, 2019

(54) PUBLISHING ELECTRONIC DOCUMENTS UTILIZING NAVIGATION INFORMATION

(71) Applicant: Adobe Inc., San Jose, CA (US)

(72) Inventors: Samuli Kekki, San Francisco, CA (US); Vladimir Grecescu, Bucuresti (RO); Dmitry Shkolnik, Mountain View, CA (US)

(73) Assignee: ADOBE INC., San Jose, CA (US)

( * ) Notice: Subject to any disclaimer, the term of this patent is extended or adjusted under 35 U.S.C. 154(b) by 596 days.

(21) Appl. No.: 14/799,363

(22) Filed: Jul. 14, 2015

(65) Prior Publication Data

US 2017/0017364 A1    Jan. 19, 2017

(51) Int. Cl.

| | |
|---|---|
| G06F 17/00 | (2019.01) |
| G06F 3/0483 | (2013.01) |
| G06F 3/0484 | (2013.01) |
| G06F 3/0485 | (2013.01) |
| G06F 17/30 | (2006.01) |
| G06F 16/957 | (2019.01) |
| G06F 12/0862 | (2016.01) |
| H04L 29/08 | (2006.01) |

(52) U.S. Cl.
CPC .......... *G06F 3/0483* (2013.01); *G06F 3/0484* (2013.01); *G06F 3/0485* (2013.01); *G06F 16/9574* (2019.01); *G06F 17/30902* (2013.01); *G06F 12/0862* (2013.01); *H04L 67/2847* (2013.01)

(58) Field of Classification Search
CPC .............. G06F 3/0483; G06F 3/0484; G06F 17/30902; G06F 12/0862; G06F 3/0485; H04L 67/2847
See application file for complete search history.

(56) References Cited

U.S. PATENT DOCUMENTS

| | | | | |
|---|---|---|---|---|
| 5,715,445 A | * | 2/1998 | Wolfe | G06F 17/30289 |
| 6,993,591 B1 | * | 1/2006 | Klemm | H04L 67/2847 |
| | | | | 707/999.002 |
| 7,467,137 B1 | * | 12/2008 | Wolfe | G06F 17/30306 |
| 7,536,385 B1 | * | 5/2009 | Wolfe | G06F 17/30861 |
| 7,747,749 B1 | * | 6/2010 | Erikson | G06F 17/30902 |
| | | | | 709/219 |
| 8,271,898 B1 | * | 9/2012 | Mattos | G06F 3/0485 |
| | | | | 345/473 |
| 8,744,988 B1 | * | 6/2014 | Hamon | G06N 99/005 |
| | | | | 706/45 |
| 9,723,036 B2 | * | 8/2017 | Eichhorn | H04L 65/403 |

(Continued)

*Primary Examiner* — Mohammed H Zuberi
*Assistant Examiner* — James H. Blackwell
(74) *Attorney, Agent, or Firm* — Keller Jolley Preece

(57) ABSTRACT

Systems and methods utilize navigation information to prepare electronic documents for display and/or provide electronic documents for display. In particular, in one or more embodiments, methods and systems identify pages likely to be selected for display based on a current page selected for display and navigation information. Moreover, one or more embodiments include systems and methods that determine an order of preparing pages for display based on navigation information. Navigation information includes, for example, navigation direction; navigation rate; a page previously selected for display; information regarding the contents of a page; and data regarding how one or more users have previously navigated one or more pages.

20 Claims, 14 Drawing Sheets

(56) References Cited

U.S. PATENT DOCUMENTS

| | | | |
|---|---|---|---|
| 9,769,030 B1* | 9/2017 | Ramalingam | H04L 67/22 |
| 2006/0070012 A1* | 3/2006 | Milener | G06F 3/0482 |
| | | | 715/822 |
| 2007/0013708 A1* | 1/2007 | Barcklay | G06F 17/30244 |
| | | | 345/557 |
| 2012/0159393 A1* | 6/2012 | Sethi | G06F 17/30554 |
| | | | 715/830 |
| 2013/0019159 A1* | 1/2013 | Civelli | G06F 17/30902 |
| | | | 715/234 |
| 2013/0219320 A1* | 8/2013 | Seet | G06F 3/0483 |
| | | | 715/776 |
| 2013/0304798 A1* | 11/2013 | Chang | G06F 9/54 |
| | | | 709/203 |
| 2014/0164985 A1* | 6/2014 | Pimmel | G06F 3/0485 |
| | | | 715/784 |
| 2014/0372511 A1* | 12/2014 | Kapadia | H04L 67/02 |
| | | | 709/203 |

* cited by examiner

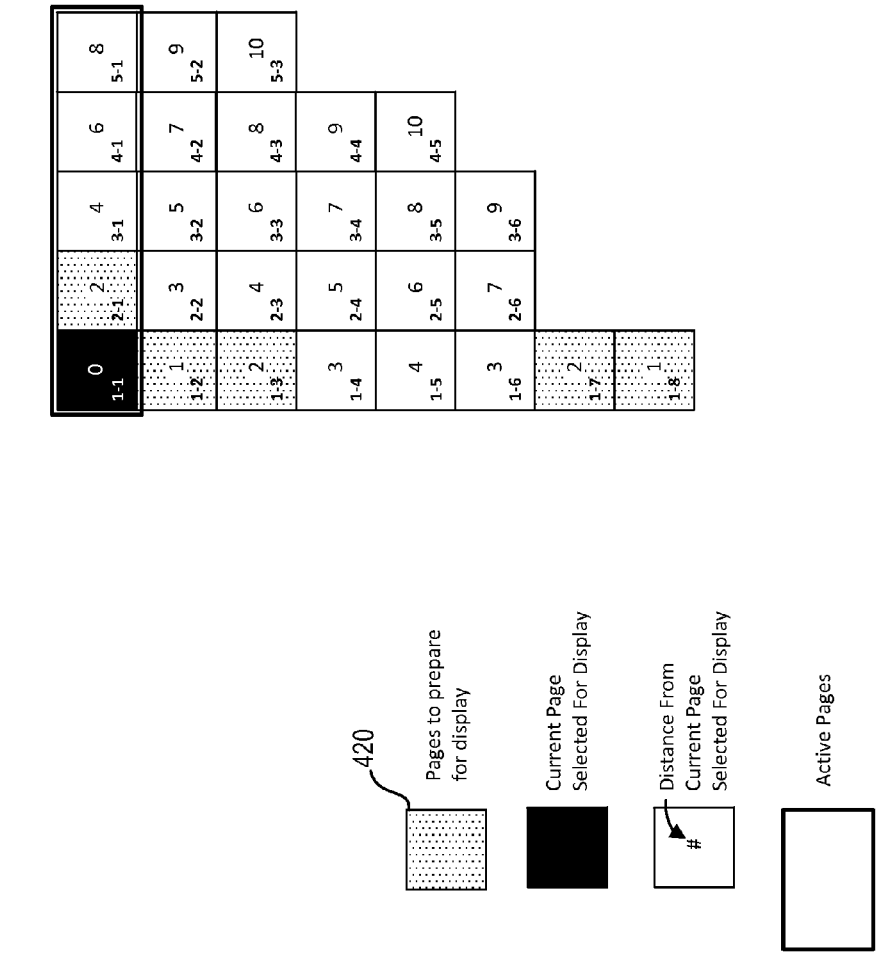

Fig. 5D
Fig. 5C

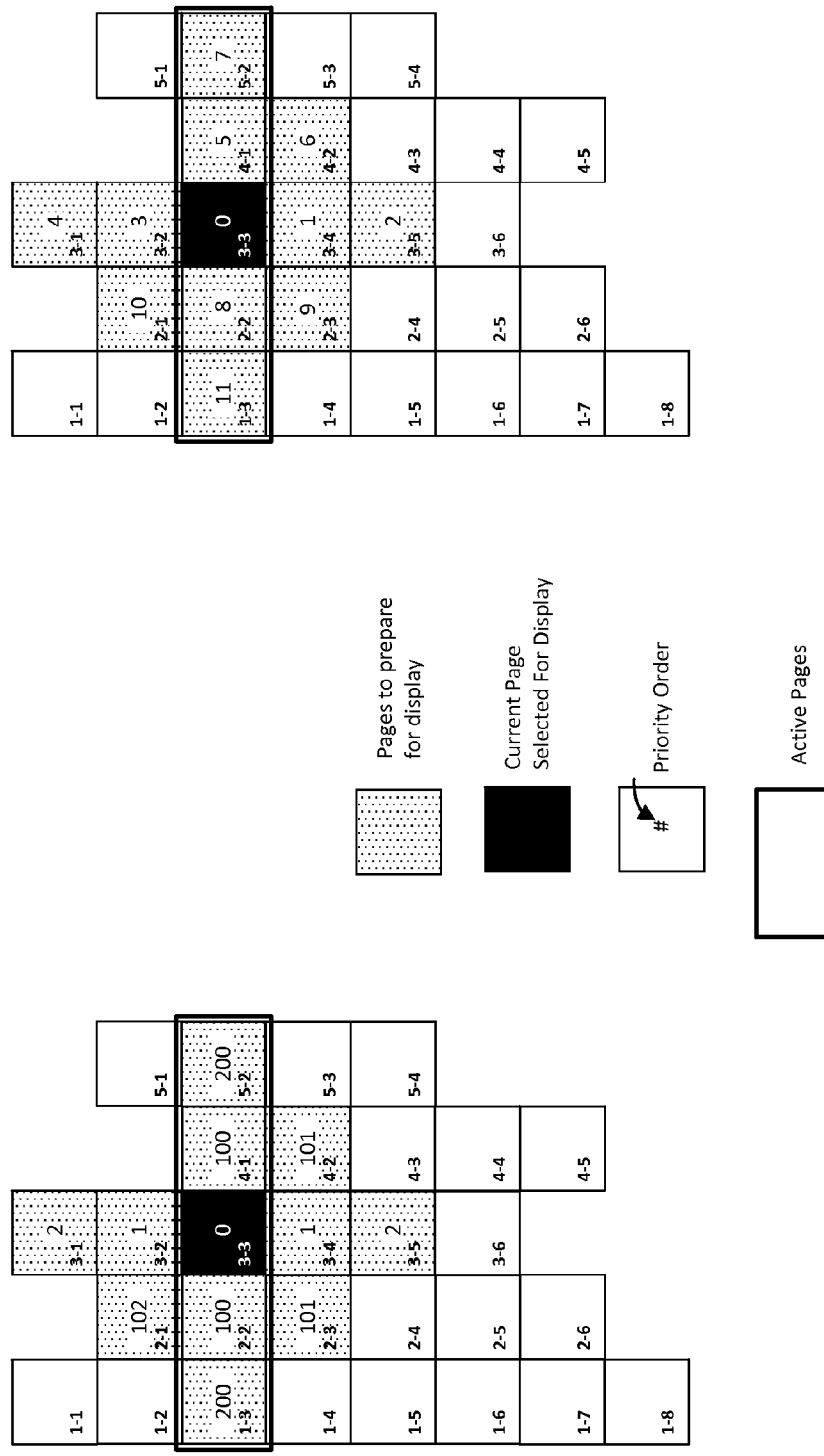

PUBLISHING ELECTRONIC DOCUMENTS UTILIZING NAVIGATION INFORMATION

BACKGROUND

1. Technical Field

The present disclosure relates generally to publishing electronic documents. More specifically, one or more embodiments of the present disclosure relate to systems and methods that publish electronic documents utilizing navigation information.

2. Background and Relevant Art

Recent years have seen a rapid increase in the prevalence of digital devices. Indeed, in addition to more traditional personal computers, individuals now commonly have access to laptops, tablets, smart phones, smart watches, smart televisions, personal digital assistants, and other computing devices. Due to the ubiquitous nature of such devices, individuals are increasingly incorporating digital devices into daily tasks and activities. For example, it is not uncommon for individuals to utilize computing devices to facilitate communication, entertainment, employment, exercise, education, shopping, and other daily activities.

As a natural result of the growing prevalence of computing devices, individuals increasingly rely on such devices for reading, reviewing, browsing, and consuming written materials. For example, individuals now commonly utilize digital devices to read books, magazines, articles, and other documents. To meet this growing demand, a number of conventional digital publication systems have arisen that provide electronic documents to individuals through their computing devices, including newspapers, magazines, books, journals or other written collections.

A digital reading environment provides unique advantages and challenges to users. For example, users can navigate through a digital document (or collection of documents) differently than a user may peruse more traditional print media. In particular, in some applications users can navigate among a collection of articles by scrolling directly from one article to another. Similarly, a user may navigate from one page in an electronic document to another page through electronic links. Thus, the "next page" in a digital document may be any number of pages that a user can reach through any number of routes, providing uniquely flexible and precise methods for moving from page to page.

Although digital documents provide users with more convenient means of navigating one or more electronic documents, users often experience frustration when seeking to browse to a page within an electronic document that is not yet loaded (or otherwise ready for display). For example, while waiting for a page to load, conventional digital systems may provide a blank white page (or some other place-holder), remain frozen on a previous page, or otherwise indicate that the system is busy until the system has prepared the page for display to the user. Individuals want the capability to browse to pages within an electronic document without having to wait for the system to prepare a desired page.

One possible solution to this problem is to load all pages of an electronic document upfront so that a user can browse to any page at any time. Such an approach, however, introduces its own problems. Conventional digital publication systems are constrained by the capabilities of the client device displaying the electronic document to the user. Computing devices cannot instantaneously process stored data files representative of an electronic document (or a compilation of multiple documents) to provide representative images to a display screen. Accordingly, loading all pages of an electronic document can take a significant amount of time, particularly for electronic documents containing a significant number of pages or high-quality images. Waiting for a digital system to load all of the pages of an electronic document can be an even greater nuisance to a user than waiting for a single page to load. Furthermore, for large electronic documents (or compilations of multiple electronic documents), computing devices may not have sufficient memory capabilities to load all pages of an electronic document for immediate retrieval.

Some conventional digital publication systems load pages in a pre-determined order and allow a user to browse an electronic document while the system loads pages. For example, some conventional systems load pages in the order they appear within the electronic document (i.e., start at the beginning and move toward the end). Other conventional systems start loading a current page requested by a user and simply load pages in the order they appear after the current requested page (i.e., start at the current page and move toward the end). These conventional systems often result in a user browsing to a location within the electronic document that has not yet been loaded, thus forcing the user to wait while the page loads. Moreover, these conventional systems often load too many pages, thus over-taxing the capabilities of the computing device and slowing the user's ability to browse. These problems and concerns only multiply where a user seeks to browse an electronic document comprising multiple different articles containing multiple pages with high-quality images.

BRIEF SUMMARY

Embodiments of the present disclosure provide benefits and/or solve one or more of the foregoing or other problems in the art with systems and methods that utilize navigation information to prepare electronic documents for display. In particular, in one or more embodiments systems and methods utilize navigation information to determine pages a user is likely to select for display, thus, reducing the amount of time and resources expended in preparing other pages. Similarly, one or more embodiments include systems and methods that determine an order of preparing the pages a user is likely to select for display.

For example, in one or more embodiments, the systems and methods disclosed herein identify articles stored on a client device with a plurality of pages. The systems and methods detect a current page selected for display from an article and identify navigation information associated with browsing the collection of articles. Based on the detected current page selected for display and the navigation information, the systems and methods determine a set of pages likely to be selected for display. The systems and methods then prepare and load the set of pages likely to be selected for display.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 4C illustrates a representation of a current page selected for display from a plurality of pages and a plurality of articles, distances from the current page, and pages identified to prepare for display in accordance with one or more embodiments;

FIG. 4D illustrates a representation of a current page selected for display from a plurality of pages and a plurality of articles, distances from the current page, and pages identified to prepare for display in accordance with one or more embodiments;

FIG. 5C illustrates a representation of a current page selected for display from a plurality of pages and a plurality of articles, distances from the current page, and pages identified to prepare for display in accordance with one or more embodiments;

FIG. 5D illustrates a representation of a current page selected for display from a plurality of pages and a plurality of articles, distances from the current page, previous pages selected for display, and pages identified to prepare for display in accordance with one or more embodiments;

FIG. 7A illustrates a representation of a current page selected for display from a plurality of pages and a plurality of articles and pages identified to prepare for display in a priority order in accordance with one or more embodiments;

FIG. 7B illustrates a representation of a current page selected for display from a plurality of pages and a plurality of articles and pages identified to prepare for display in a priority order in accordance with one or more embodiments;

DETAILED DESCRIPTION

Figure 1:
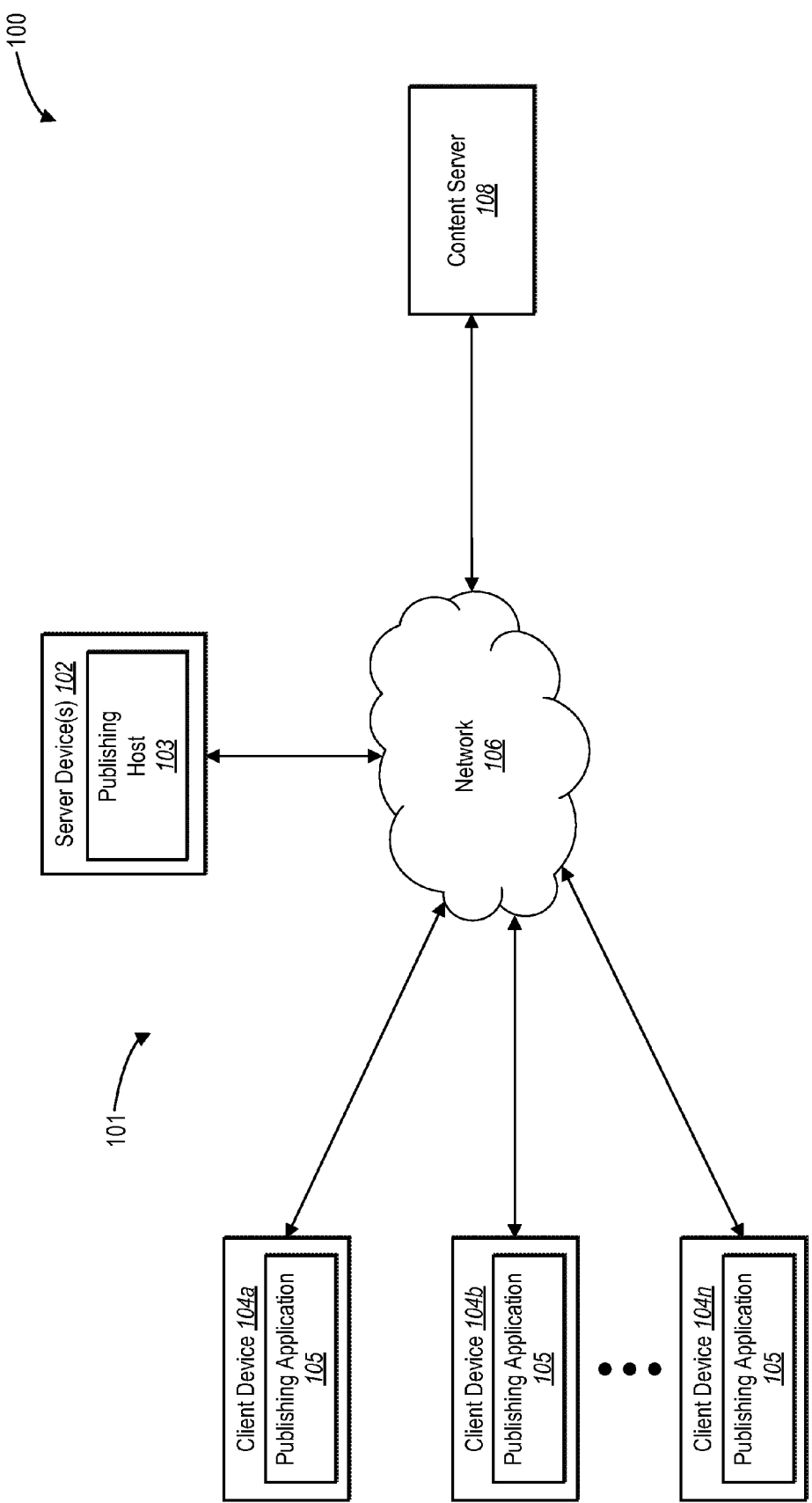
FIG. 1 illustrates a schematic diagram of an exemplary environment in which the publishing system can operate in accordance with one or more embodiments.

One or more embodiments of the present disclosure include a digital publishing system. In particular, one or more embodiments include a digital publishing system that displays electronic documents to a user via a computing device. Specifically, to reduce the amount of time required for publishing and browsing electronic documents, in one or more embodiments, the digital publishing system can identify navigation information and determine a subset of pages likely to be selected for display based on the navigation information.

For example, in one or more embodiments the digital publishing system identifies a collection of articles stored on a client device. The digital publishing system detects a current page selected for display from an article and identifies navigation information related to browsing the collection of articles. Based on the current page selected for display and the navigation information, the digital publishing system determines a set of pages a user is likely to select for display and prepares the set of pages for display.

As just mentioned, to reduce the amount of time and frustration associated with browsing one or more electronic documents through a computing device, in one or more embodiments, the digital publishing system detects and utilizes navigation information to identify pages a user is likely to select for display. Navigation information includes information related to browsing of a collection of articles. For instance, navigation information can include a direction that a user navigates amongst pages within a collection of articles (e.g., navigation from a page in one article to a page in another article), a rate of browsing, information regarding how users have previously navigated the collection of articles, information regarding interests of a particular user, information regarding how a particular user navigates electronic documents, information regarding the collection of articles, and so forth. This navigation information provides the digital publishing system with an indication of pages a user is likely to select in continuing to browse within one or more electronic documents.

Based on this navigation information, in one or more embodiments, the digital publishing system determines a set of pages to prepare for display. More particularly, the digital publishing system can use navigation information to establish one or more display criteria. Display criteria can include any number of rules for determining pages to prepare to display, including, for example, one or more distances between a current page selected for display and one or more additional pages. The digital publishing system can identify one or more pages that satisfy the display criteria and prepare those pages for display.

For example, based on a determination of a navigation direction (e.g., moving from one article to another in a collection of articles), the digital publishing system can establish display criteria that emphasize the navigation direction. For instance, the digital publishing system can establish display criteria that prepare additional pages for display in the direction of navigation (e.g., pages across multiple articles in a collection of articles) and prepare fewer pages for display in the direction opposite the direction of navigation. In this fashion, the digital publishing system can prepare pages a user is more likely to select for display (i.e., those pages in the direction that the user is browsing) based on navigation information. Similarly, the digital publishing system can prepare fewer pages that a user is less likely to select for display, preserving valuable computing resources.

In some embodiments, the digital publishing system establishes general display criteria, for example, a rule that prepares all pages for display that fall within a certain distance of the current page selected for display. In other embodiments, the digital publishing system establishes unique criteria for a subset of pages, or even criteria for individual pages. Thus, in some embodiments the digital publishing system can generate display criteria to reflect the circumstances, criteria, or features of each individual page (or a subset of pages). For example, the digital publishing system can establish display criteria for a page containing high-quality images that are different than display criteria a page containing simple text. More specifically, the digital publishing system can set display criteria that will prepare a page containing high-quality images for display further in advance than a page containing simple text.

Because, as just discussed, display criteria can comprise one or more distances from a current page selected for display, the digital publishing system can also calculate distances between pages in one or more electronic documents. For instance, in one or more embodiments the digital publishing system can determine distance along one or more navigation routes between pages. For example, in a collection of documents, navigation routes may exist between consecutive pages in a single document, between a page in a first document and a page in a second document, or between other pages (for example, through a link from one page to another). The digital publishing system can detect navigation routes between pages, calculate one or more distances between pages along the navigation routes, and utilize the distances to identify pages that satisfy display criteria.

To illustrate, consider a collection of articles containing a plurality of pages. A user can open a file containing the collection of articles and navigate from a title page, to a first page of a first article, to a first page of a second article, and to the first page of a third article. The digital publishing system can detect that the user has navigated across three pages in consecutive documents (i.e., a navigation direction) at a certain rate (i.e., a navigation rate). The digital publishing system can also access information regarding how other users have navigated this collection of articles (e.g., users that only view the first page of the first article tend to scroll to the sixth article in the collection of articles). Based on this information, the digital publishing system can generate a rule (i.e., display criteria) establishing that the digital publishing system will prepare for display any page within five pages of the current page selected for display in the navigation direction and within two pages selected for display in all other directions (or some other display rule). The digital publishing system can determine routes between the pages in the collection of documents, then identify the pages that satisfy the rule (e.g., pages within the defined number of pages from the current page selected for display along various navigation routes), and prepare the identified pages for display. In this manner, the digital publishing system can identify and prepare pages a user is likely to select for display.

To further reduce the time required to display pages a user is likely to view, the digital publishing system can also determine a priority order for preparing pages to display. For instance, based on navigation information and the current page, the digital publishing system can determine a priority order for a set of pages a user is likely to navigate to and then prepare the set of pages according to the priority order. By preparing pages for display according to the priority order, the digital publishing system not only assists in preparing a set of pages a user is likely to request, but assists in preparing the set of pages in the order a user is likely to request each individual page. As such, the digital content system can reduce the amount of time a user is likely to wait for the digital publishing system to display a page.

Moreover, to avoid unnecessarily taxing computing resources, once the digital publishing system has prepared a set of pages for display, the digital publishing system can also drop (e.g., unload) one or more pages previously prepared for display. In one or more embodiments, the digital publishing system compares an identified set of pages likely to be selected for display with a set of pages previously prepared for display and unloads the pages previously prepared for display that are not within the identified set of pages likely to be selected for display.

In alternative embodiments, the digital publishing system establishes dropping criteria (as described below) separate and distinct from display criteria. For instance, in one or more embodiments, the digital publishing system determines dropping criteria (and correspondingly a set of pages that will remain prepared for display) based on navigation information or other information. Such embodiments can preserve computing resources by avoiding having to unnecessarily repeat the process of preparing pages for display, while also placing informed limits on the pages that remain prepared for display.

As used herein, the phrase "prepare for display" refers to any process, step, or method required to display an electronic document on a computing device. In particular, the phrase "prepare for display" can include downloading, converting, loading, processing, cataloging, rendering, or scanning an electronic file. For example, the phrase "prepare for display" can include converting a PDF to another format (e.g., bitmap or PNG) for rendering on a display device. More particularly, each page can include images, vector graphics, text, video clips, etc. The "prepare for display" can include rendering vector graphics into bitmap images and otherwise placing the page in condition for display on a client device. The phrase "prepare for display" can include different steps, processes, or methods depending on the computing device (e.g., personal computer, tablet, smartphone, smart watch, smart television, etc.), operating system, application, and so forth.

As mentioned, the phrase "prepare for display" also includes loading an electronic file. As used herein, the term "loading" (or "load") refers to the process of placing digital information into temporary memory of any kind. In particular, the term "loading" includes the process of placing information stored on a client device into temporary memory. For example, loading a file can include accessing a hard drive and transferring, copying, cataloging, or referencing information stored in the hard drive in random access memory (or RAM).

As used herein, the term "drop" refers to stopping, finishing, cancelling, or undoing any process, step, or method used to display an electronic document on a computing device. For instance, the term "drop" includes any act that causes a page prepared for display in an electronic document to no longer be prepared for display. In particular, the term "drop" can include deleting, removing from memory, un-cataloging, unloading, or un-rendering an electronic file. For example, the term "drop" can include unloading an electronic file from temporary memory or deleting a PNG rendering of a PDF.

As used herein, the term "navigation information" refers to any information bearing on browsing of one or more electronic documents. In particular, navigation information can include information indicating one or more pages from one or more electronic documents a user is likely to select for display. For example, navigation information can include a navigation direction, a navigation rate, one or more pages previously selected for display, information regarding the contents of one or more electronic documents, data regarding how one or more users have previously navigated one or more documents, or other information relating to browsing one or more electronic documents. Further detail regarding navigation information will be provided below with respect to the description of particular embodiments of the digital publishing system.

As used herein, the term "electronic document" refers to any form of electronic content, regardless of form. An electronic document includes electronic files capable of display on a display screen associated with a computing device. For example, an electronic document can include electronic files in the form of a word processing document, a PDF file, an image file, an e-mail file, a text file, an audio file or any other electronic file. Moreover, regardless of file type, an electronic document can also include a variety of materials, including electronic newspapers, books, magazines, articles, publications, collections, or other written works (in isolation or in combination). As used herein, the term "article" refers to an electronic file containing a plurality of electronic pages.

FIG. 1 illustrates a schematic diagram of one embodiment of an exemplary environment 100 in which a digital publishing system 101 can operate. In one or more embodiments, the exemplary environment 100 includes one or more server device(s) 102, client devices 104a, 104b, . . . 104n, network 106, and a content server 108. The network 106 may be any suitable network over which the computing devices can communicate. Example networks are discussed in more detail below with regard to FIG. 12. The publishing system 101 can include a publishing host 103 implemented by the one or more server device(s) 102 and instances of a publishing application 105 implemented by client devices 104a-104n.

Although FIG. 1 illustrates a particular arrangement of the client devices 104a-104n, the network 106, the content server 108, and the one or more server devices 102, various additional arrangements are possible. For example, while FIG. 1 illustrates the content server 108 and the one or more server devices 102 as separate devices. In such embodiments, the publishing system 101 obtain content from third-party content servers 108. In one or more alternative embodiments, the publishing host 103 can include the functionality of the content server 108.

Similarly, although the environment 100 of FIG. 1 is depicted as having various components, the environment 100 may have additional or alternative components. For example, the publishing system 101 can be implemented on a single computing device. In particular, the publishing system 101 may be implemented in whole by the publishing application 105 on the client device 104a or by the publishing host 103 on the server device(s) 102.

The publishing host 103 hosted by the one or more servers 102 can work in conjunction with instances of a publishing application 105 on a client device 104a-104n to download, stream, or otherwise access, view, and/or interact with content hosted by the content server 108. For example, the publishing application 105 can allow a user to select desired content (e.g., one or more electronic documents) hosted by one or more content servers 108 or the publishing host 103. The publishing application 105 can identify one or more pages to prepare for display from the one or more electronic documents based on the navigation information obtained by the publishing application 105. The publishing application 105 can also identify a publishing order for the one or more pages to prepare for display.

In alternative embodiments, the publishing host 103 identifies one or more pages to prepare for display from the one or more electronic documents based on navigation information and sends data identifying the pages to prepare for display to the client device 104a. Similarly the publishing host 103 can identify a priority order and send the priority order to the client device 104a. In such embodiments, the publishing host 103 controls the electronic documents (or the portions of electronic documents) to send to the client device 104a. For example, the publishing host 103 can send to the client device 104a a subpart of a collection of electronic documents (e.g., the pages to prepare for display or a subset of articles from a collection of articles) and retain the remainder of the collection of electronic documents.

In one or more embodiments, the publishing system 101 operates in conjunction with the content server 108. In particular, the publishing system 101 obtains content and/or metadata or tracking information from the content server 108. To illustrate, the publishing system 101 obtains navigation information or other details about content from the content server 108. The publishing system 101 can actively collect information independently of a particular client device and independent of other components of the exemplary embodiment 100. For example, the publishing system 101 can actively collect information from interactions between users and one or more electronic documents hosted at the content server 108.

In alternative embodiments, the environment 100 includes an analytics system. The analytics system can comprise a third-party system that facilitates the collection of data, such as user data informing navigation information. For example, the third-party analytics system can provide information regarding browsing of one or more electronic documents to the publishing system 101. The publishing system 101 can actively provide display criteria based on navigation information or other information. Similarly, an analytics system can actively collect and monitor user data providing navigation information for the publishing system 101. The publishing system 101 can provide and update display criteria as additional user data informs the publishing process. In other embodiments, the publishing system 101 collects user data or navigation information directly.

In alternative or additional environments, the publishing host 103 receives or provides information directly from client devices 104a-104n. For example, the client devices 104a-104n provide navigation information, or other information to the publishing host 103. Alternatively, client devices 104a-104n can provide such information to the content server 108, which in turn can provide the information to the publishing host 103.

Figure 2:
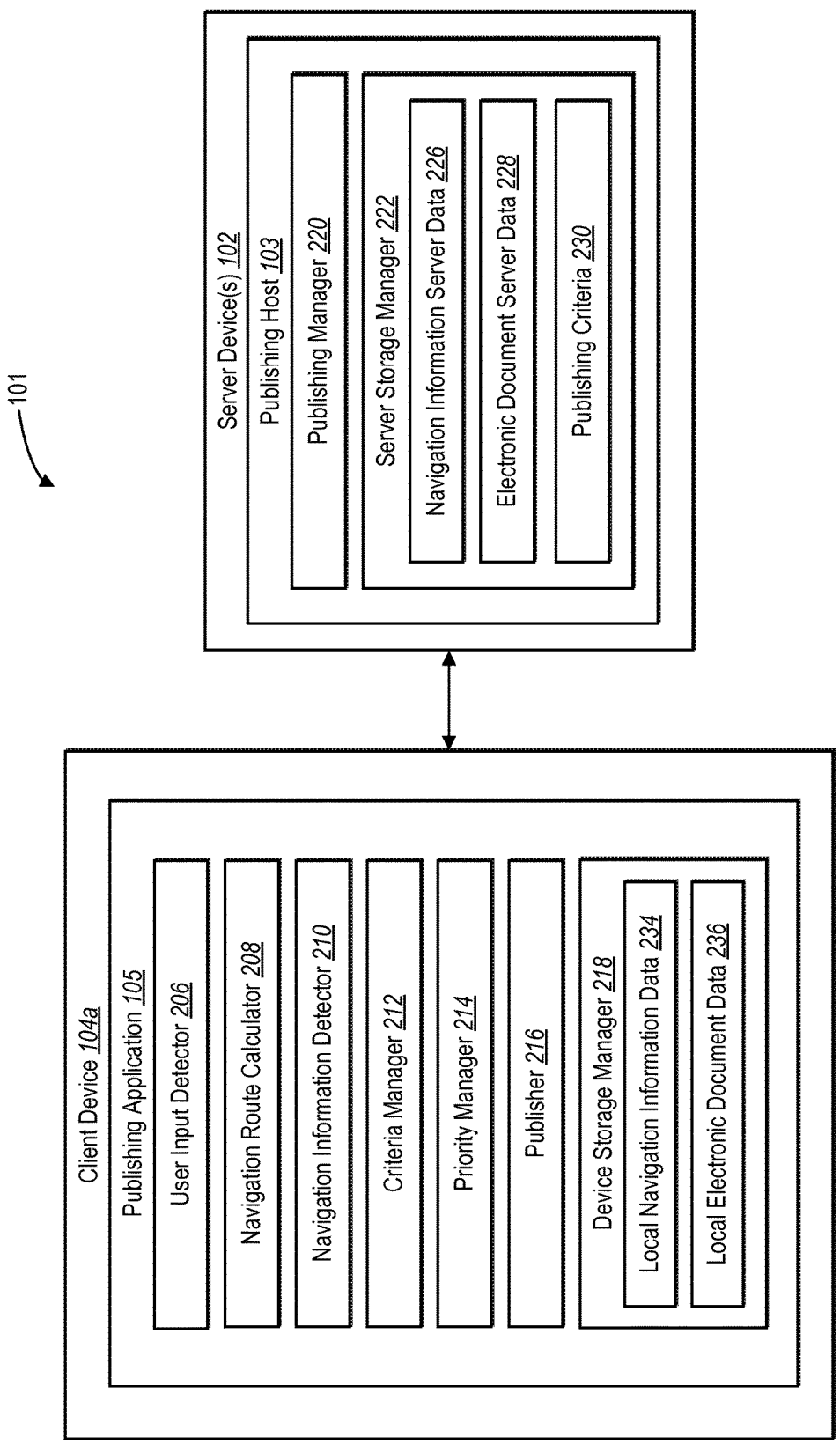
FIG. 2 illustrates a schematic diagram of a publishing system in accordance with one or more embodiments.

FIG. 2 illustrates an embodiment of an exemplary publishing system 101 (e.g., publishing host 103 and publishing application 105). As noted previously, a client device 104a can implement the publishing application 105. As shown, the publishing application 105 may include, but is not limited to, a user input detector 206, a navigation route calculator 208, a navigation information detector 210, a criteria manager 212, a priority manager 214, a publisher 216, and a device storage manager 218. On the other hand, one or more server devices 102 can implement the publishing host 103. The publishing host 103 can include a publishing manager 220 and a server storage manager 222.

Each of the components 206-222 of the publishing system 101 and their corresponding elements (as shown in FIG. 2) may be in communication with one another using any suitable communication technologies. It will be recognized that although components 206-222 of the publishing system 101 and their corresponding elements are shown to be separate in FIG. 2, any of components 206-222 and their corresponding elements may be combined into fewer components, such as into a single facility or module, divided into more components, or configured into different components as may serve a particular embodiment.

The components 206-222 of the publishing system 101 and their corresponding elements can comprise software, hardware, or both. For example, the components 206-222 and their corresponding elements can comprise one or more instructions stored on a computer-readable storage medium and executable by processors of one or more computing devices. When executed by the one or more processors, the computer-executable instructions of the publishing system 101 can cause the client device 104a and/or the server device(s) 102 to perform the methods described herein. Alternatively, the components 206-222 and their corresponding elements can comprise hardware, such as a special purpose processing device to perform a certain function or group of functions. Additionally or alternatively, the components 206-222 and their corresponding elements can comprise a combination of computer-executable instructions and hardware.

Furthermore, the components 206-222 may, for example, be implemented as one or more stand-alone applications, as one or more modules of an application, as one or more plug-ins, as one or more library functions or functions that may be called by other applications, and/or as a cloud-computing model. Thus, the components 206-222 may be implemented as a stand-alone application, such as a desktop or mobile application. Furthermore, the components 206-222 may be implemented as one or more web-based applications hosted on a remote server. Alternatively or additionally, the components 206-222 may be implemented in a suit of mobile device applications or "apps." To illustrate, the components 206-222 may be implemented in a publishing application, including but not limited to ADOBE DIGITAL PUBLISHING SUITE and/or ADOBE DIGITAL CONTENT VIEWER. "ADOBE," "DIGITAL PUBLISHING SUITE," and "DIGITAL CONTENT VIEWER" are either registered trademarks or trademarks of Adobe Systems Incorporated in the United States and/or other countries.

Furthermore, while FIG. 2 illustrates certain components 206-218 of the publishing system 101 included as part of the publishing application 105 implemented by the client device 104a and other components 220, 222 as part of the publishing host 103, the present invention is not so limited. In alternative embodiments, the publishing application 105 can implement all, additional, or alternative components 206-222 of the publishing system 101. In further embodiments, the publishing host 102 can implement all, additional, or alternative components 206-222 of the publishing system 101.

As mentioned above, and as illustrated in FIG. 2, the publishing application 105 can include the user input detector 206. In one or more embodiments, the user input detector 206 can detect, identify, monitor, receive, process, capture, and/or record various types of user input. For example, the user input detector 206 can detect one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction. The user input detector 206 can operate in conjunction with any number of user input devices or computer devices (in isolation or in combination), including personal computers, laptops, smartphones, smart watches, tablets, touchscreen devices, televisions, personal digital assistants, mouse devices, keyboards, track pads, or stylus devices. Similarly, the user input detector 206 can detect a user interaction with respect to a variety of user interface elements, such as selection of a graphical button or a drag event within a graphical object. Moreover, the user input detector 206 can communicate with, and thus detect user input with respect to, a variety of programs, applications, plug-ins, operating systems, user interfaces, or other implementations in software or hardware.

FIG. 2 illustrates that the publishing application 105 can also include the navigation route calculator 208. In one or more embodiments the navigation route calculator 208 detects, determines, identifies, calculates, or obtains one or more navigation routes. As used herein the term "navigation routes" refers to connections, links, relations, pathways, routes, or any other elements or conduits that permit a user to browse between electronic documents or between pages in one or more electronic documents. For example, in one or more embodiments the navigation route calculator 208 can determine navigation routes between a current page selected for display in an electronic document and one or more pages in the electronic document (or one or more separate electronic documents).

Furthermore, in one or more embodiments the navigation route calculator 208 can determine what pages will be (or can be) selected for display upon various user interactions. For example, in some embodiments the navigation route calculator 208 can determine what pages in the same document can be displayed based upon user interaction with the current page (e.g., a page before the current page selected for display and a page after the current page selected for display). Similarly, in some embodiments the navigation route calculator 208 can detect a hyperlink in a first page that, when selected by a user, causes the client device 104a to navigate to a second page selected for display. As a further example, in one or more embodiments, the navigation route calculator 208 can determine that a particular page will be displayed upon a user interaction indicating a desire to switch from a first article to a second article.

The navigation route calculator 208 can also compile one or more navigation routes. For example, in one or more embodiments the navigation route calculator 208 can combine a series of individual navigation routes to create a navigation map. As used herein, the term "navigation map" refers to a combination of a plurality of navigation routes between pages in one or more electronic documents. A navigation map can comprise a database, array, data table, string, look-up table, library or any other electronic data describing navigation routes between pages. A navigation map can describe navigation routes between all or a subset of pages in all or a subset of electronic documents. Thus, the navigation route calculator 208 can create a navigation map that describes all navigation routes between pages in one or more electronic documents (or a subset of navigation routes).

Moreover, as shown in FIG. 2, the publishing application 105 can also include the navigation information detector 210. In one or more embodiments, the navigation information detector 210 processes, gathers, collects, identifies, obtains, retrieves, and/or stores navigation information. In particular, the navigation information detector 210 can collect navigation information related to browsing one or more electronic documents. For example, the navigation information detector 210 can collect navigation information indicating one or more pages a user is likely to select for display or one or more pages the user has selected.

The navigation information detector 210 can obtain navigation information from any available source. For example, the navigation information detector 210 can obtain navigation information from the client device 104a, from local navigation information data 234, from the server device(s) 102 (e.g., navigation information server data 226), from one or more electronic documents, from an application displaying one or more electronic documents, from metadata, or any other source providing information bearing on one or more pages a user is likely to select for display.

In addition to obtaining navigation information, the publishing system 101 can also utilize navigation information to facilitate display of one or more electronic documents. Accordingly, as illustrated in FIG. 2, the publishing application 105 also includes the criteria manager 212. In one or more embodiments, the criteria manager 212 establishes, identifies, calculates, determines, and/or receives criteria relating to display of one or more electronic documents. In particular, the criteria manager 212 can manage criteria relating to documents to display. For example, the criteria manager 212 can manage display criteria related to preparing for display pages a user is likely to select for display. Similarly, the criteria can manage dropping criteria related to dropping pages so that pages are no longer prepared for display.

The criteria manager 212 can receive, utilize, analyze, manipulate, and interpret navigation information as necessary to perform its functions. In particular, the criteria manager 212 can analyze navigation information to identify a set of pages a user is likely to select for display. For example, the criteria manager 212 can utilize navigation information to identify, calculate, or determine criteria (e.g., display criteria and dropping criteria). To illustrate, the criteria manager 212 can receive navigation information from the navigation information detector 210 indicating that the user has navigated from a second to a third page in an electronic document. In response, the criteria manager 212 can establish display criteria (i.e., prepare for display four pages in the navigation direction and two pages opposite the navigation direction) and dropping criteria (i.e., drop all pages more than five pages away in the navigation direction and more than three pages opposite the navigation direction).

The criteria manager 212 can also determine whether one or more pages satisfy criteria established, identified, calculated, determined, and/or received by the criteria manager 212. For instance, where the criteria manager 212 sets criteria related to a distance from a current page selected for display, the criteria manager 212 can identify pages that satisfy the distance criteria. As such, the criteria manager 212 can identify a set of pages likely to be selected for display.

Similarly, the criteria manager 212 can also determine whether one or more pages satisfy dropping criteria. In particular, the criteria manager 212 can identify pages that the publishing system 101 has previously prepared for display. The criteria manager 212 can apply dropping criteria to the pages previously prepared for display and determine a set of pages that satisfy the dropping criteria (i.e., a set of pages to drop) or a set of pages from the pages previously prepared that do not satisfy the dropping criteria (i.e., a set of pages that should remain prepared for display). In one or more embodiments, the criteria manager 212 also determines a set of pages to drop by comparing a set of pages identified as pages to prepare for display with a set of pages previously prepared for display.

As discussed, the publishing system 101 can include one or more distances as criteria for facilitating display of one or more electronic documents (e.g., display criteria or dropping criteria). In one or more embodiments, the criteria manager 212 determines distances utilizing navigation routes provided by the navigation route calculator 208. In particular, to calculate a distance, the criteria manager 212 can count distance (e.g., pages) along one or more navigation routes between pages. For example, to determine a distance between a current page selected for display and a second page, the criteria manager 212 can obtain the shortest navigation route from the navigation route calculator 208 and count the number of pages between the current page selected for display and the second page along the navigation route. The criteria manager 212 can then determine whether the second page satisfies the pertinent criteria (e.g., display criteria or dropping criteria).

The criteria manager 212 can establish criteria generally for one or more electronic documents, establish criteria for subparts of one or more electronic documents, or establish criteria for individual pages in one or more electronic documents. For instance, the criteria manager 212 can establish criteria applicable to an entire collection of articles (e.g., display five pages in the direction of navigation from the current page selected for display and three pages in the direction opposite the direction of navigation). Additional or alternatively, the criteria manager 212 can establish criteria for individual pages or a group of pages (e.g., prepare a first page for display when the first page is within a distance of three pages from the current page selected for display but prepare a second page for display when the second page is within a distance of six pages from the current page selected for display).

In addition to identifying one or more documents to drop or prepare for display, the publishing host 103 can also prioritize one or more pages for display. Thus, as illustrated in FIG. 2, the publishing application 105 can also include the priority manager 214. In one or more embodiments, the priority manager 214 generates, establishes, identifies, calculates, determines, receives, modifies, and manages a priority order related to the preparation of one or more pages or one or more electronic documents for display. For example, the priority manager 214 can obtain a set of pages to prepare for display (e.g., a set of pages likely to be selected for display) from the criteria manager 212 (and/or a set of documents that have previously been prepared for display), and determine a priority order for the pages in the set of pages to prepare for display.

In one or more embodiments, the priority manager 214 determines a priority order based on the current page selected for display. For example, the priority manager 214 can establish a priority order based on the distance between a current page selected for display and another page. In particular, the priority manager 214 can determine one or more distances (e.g., number of pages) along one or more navigation routes and determine priority order based on the one or more distances. To illustrate, the priority manager 214 can give higher priority to a first page that is one page away from the current page selected for display than to a second page that is five pages away from the current page selected for display.

In one or more embodiments, the priority manager 214 determines a priority order based on navigation information (e.g., navigation information received from the navigation information detector 210). For instance, based on navigation information indicating a navigation direction, the priority manager 214 can prioritize one or more pages in the navigation direction over one or more pages in the direction opposite the navigation direction.

The priority manager 214 can also adjust a priority order. For example, the priority manager 214 can adjust priority order in response to a user browsing to a new page in an electronic document. The priority manger 214 can receive new navigation routes from the navigation route calculator 208, receive a new set of pages to display from the criteria manager 212, can receive new navigation information from the navigation information detector 210, and adjust the priority order. More specifically, in some circumstances a user may navigate to a new current page selected for display before the publishing system 101 has completed preparing one or more documents for display. In such circumstances, the priority manager 214 can adjust the priority order for pages that the publishing system 101 has not prepared for display.

As illustrated in FIG. 2, the publishing application 105 can also include the publisher 216. The publisher 216 can perform all steps to display an electronic document via a display screen associated with a computing device, all steps to prepare an electronic document for display, and steps to drop an electronic document. In particular, the publisher 216 can access, process, render, convert, catalog, publish, load, send, drop, delete from memory, un-render, un-catalog, or un-publish one or more electronic documents or one or more pages from one or more electronic documents. For example, the publisher 216 can prepare for display a set of pages likely to be selected for display. In particular, the publisher 216 can receive an identified set of pages likely to be selected for display from the criteria manager 212 and a priority order from the priority manager 214 and prepare for and display the set of pages likely to be selected for display according to the priority order.

Furthermore, as mentioned, the publisher 216 can also drop one or more pages. For instance, the publisher 216 can receive a set of pages to drop (and/or a set of pages that should remain prepared for display) from the criteria manager 212, and drop one or more pages based on the set of pages to drop (or the set of pages that should remain prepared for display).

As discussed above, and as shown in FIG. 2, the publishing application 105 can also include the device storage manager 218. The device storage manager 218 facilitates storage of information for the publishing system 101. In particular, the device storage manager 218 can store information used by one or more of the components of the publishing system 101 to facilitate the performance of various operations associated with the publishing system 101. The device storage manager 218 may include, but is not limited to, local navigation information data 234, and local electronic document data 236.

The device storage manager 218 may also store any additional or alternative information corresponding to the operation of the publishing system 101. The data storage manager can maintain additional or alternative data as may serve a particular implementation. The device storage manager 218 may communicate with any component within the publishing system 101 to obtain or share information for publishing an electronic document. In one or more embodiments, the device storage manager 218 includes one or more servers on which various types of data are stored. For example, the data storage manager may include or may be implemented in a data storage environment.

As just mentioned, and as illustrated in FIG. 2, the device storage manager 218 may include local navigation information data 234. Local navigation information data 234 can include any navigation information. For example, local navigation information data 234 can include navigation information previously detected (and stored) by the navigation information detector 210. Additionally or alternatively, local navigation information data 234 can include navigation information obtained from the server device(s) 102 (e.g., navigation information server data 226).

Similarly, in one or more embodiments local navigation information data 234 includes information regarding previous user interactions with a computing device. For example, local navigation information data 234 can include information related to how one or more users have interacted with one or more electronic documents or one or more pages in one or more electronic documents. In particular, local navigation information data 234 can include information regarding how a user of the client device 104a has browsed a particular collection of articles. The publishing system 101 (e.g., the navigation information detector 210 or the criteria manager 212) can utilize local navigation information data 234 to detect navigation information, identify one or more pages to prepare for display, and otherwise publish electronic documents.

As FIG. 2. further illustrates, the device storage manager 218 may include local electronic document data 236. In one or more embodiments, local electronic document data 236 includes information regarding one or more electronic documents that may be displayed on the client device 104a. For example, local electronic document data 236 may include an electronic file for displaying a book, magazine, article, or other electronic document, such as a PDF file, HTML file, PNG file, or other electronic file.

Local electronic document data 236 may also include metadata regarding one or more electronic documents (including navigation information). For example, the local electronic document data 236 may include information regarding the size, contents, attributes, subject matter, or attributes of one or more electronic documents. Similarly, local electronic document data 236 may include metadata related to displaying the electronic document. For example, metadata contained within the local electronic document data 236 may identify criteria (e.g., display criteria or drop criteria) related to displaying one or more electronic documents or one or more pages in one or more electronic documents. In particular, local electronic document data 236 can store, as an overlay to a particular page, information related to displaying the particular page via the publishing system 101.

As discussed above, and as illustrated in FIG. 2, the publishing application 101 can also include the publishing host 103 implemented by the server device(s) 102. The publishing host 103 can include the publishing manager 220. The publishing manager 220 can send and receive information with regard to one or more client devices (such as client device 104a) to facilitate operations of the publishing system 101. For example, the publishing manager 220 can send or receive information to or from one or more client devices. In particular, in one or more embodiments the publishing manager 220 sends or receives navigation information, one or more electronic documents, publishing criteria, or other information. To illustrate, the publishing manager 220 can receive information from the client device 104a regarding how a user has navigated an electronic document and store the information in the server storage manager 222. The publishing manager 220 can also provide information from the server storage manager 222 to the client device 104a indicating how a user is likely to browse one or more electronic documents.

The publishing manager 220 can also process, gather, collect, identify, obtain, retrieve, and/or store navigation information. For example, the publishing manager 220 can receive information regarding how users have navigated one or more electronic documents and store the information as navigation information server data 226. Similarly, the publishing manager 220 can receive information regarding the contents of one or more electronic documents and store the information as navigation information server data 226.

The publishing manager 220 can also establish, identify, calculate, determine, receive, and/or store criteria relating to publishing one or more electronic documents (e.g., display criteria or dropping criteria). The publishing manager 220 can store such criteria (e.g. as publishing criteria 230 or as metadata in electronic document server data 228) and/or send criteria to the client device 104a (e.g., to local electronic document data 236, to local navigation information data 234, or to the criteria manager 212).

FIG. 2 also illustrates that the publishing host 103 can include the server storage manager 222. The server storage manager 222 maintains information for the server device(s) 102. In one or more embodiments, the server storage manager 222 includes navigation information server data 226, electronic document server data 228, and publishing criteria 230. The server device(s) 102 can store additional, less, or different information as pertinent to a particular embodiment.

As just mentioned, the device storage manager 218 may include navigation information server data 226. Navigation information server data 226 can include any navigation information data. For example, the navigation information server data 226 can include information regarding how a user is likely to browse one or more electronic documents. In particular, navigation information server data 226 can include information related to how users have previously browsed one or more electronic documents.

Additionally or alternatively, in one or more embodiments navigation information server data 226 includes information regarding the contents of one or more electronic documents or one or more pages. For example, navigation information server data 226 can include information indicating certain pages contain advertising content, indicating certain pages have large elements, or indicating other features. Similarly, navigation information server data 226 can include information regarding the anticipated desirability of one or more documents or one or more pages.

Moreover, as illustrated in FIG. 2, the server storage manager 222 includes electronic document server data 228 in one or more embodiments. The electronic server data 228 may include information regarding one or more electronic documents. For example, electronic server data 228 may include an electronic file comprising a digital collection of articles. As discussed previously, navigation information or other information regarding one or more electronic documents can also be stored (e.g., as metadata) with electronic document server data 228. Thus, for example, the publishing manager 220 can create metadata or an overlay within electronic document server data 228 (e.g., from navigation information server data 226 or some other source).

In addition, as shown in FIG. 2, the server storage manager 222 may include publishing criteria 230. Publishing criteria 230 can include criteria related to publishing one or more electronic documents. In particular, publishing criteria 230 may include display criteria, dropping criteria, or other criteria. In addition, publishing criteria 230 may also include information relating one or more criteria to one or more variables (e.g., presence or absence of particular navigation information). For instance, publishing criteria 230 can provide information indicating that the client device 104a should utilize certain criteria (e.g., prepare for display pages within a particular distance of a current page selected for display) in response to certain information (e.g., a certain navigation direct or navigation rate).

Figure 3:
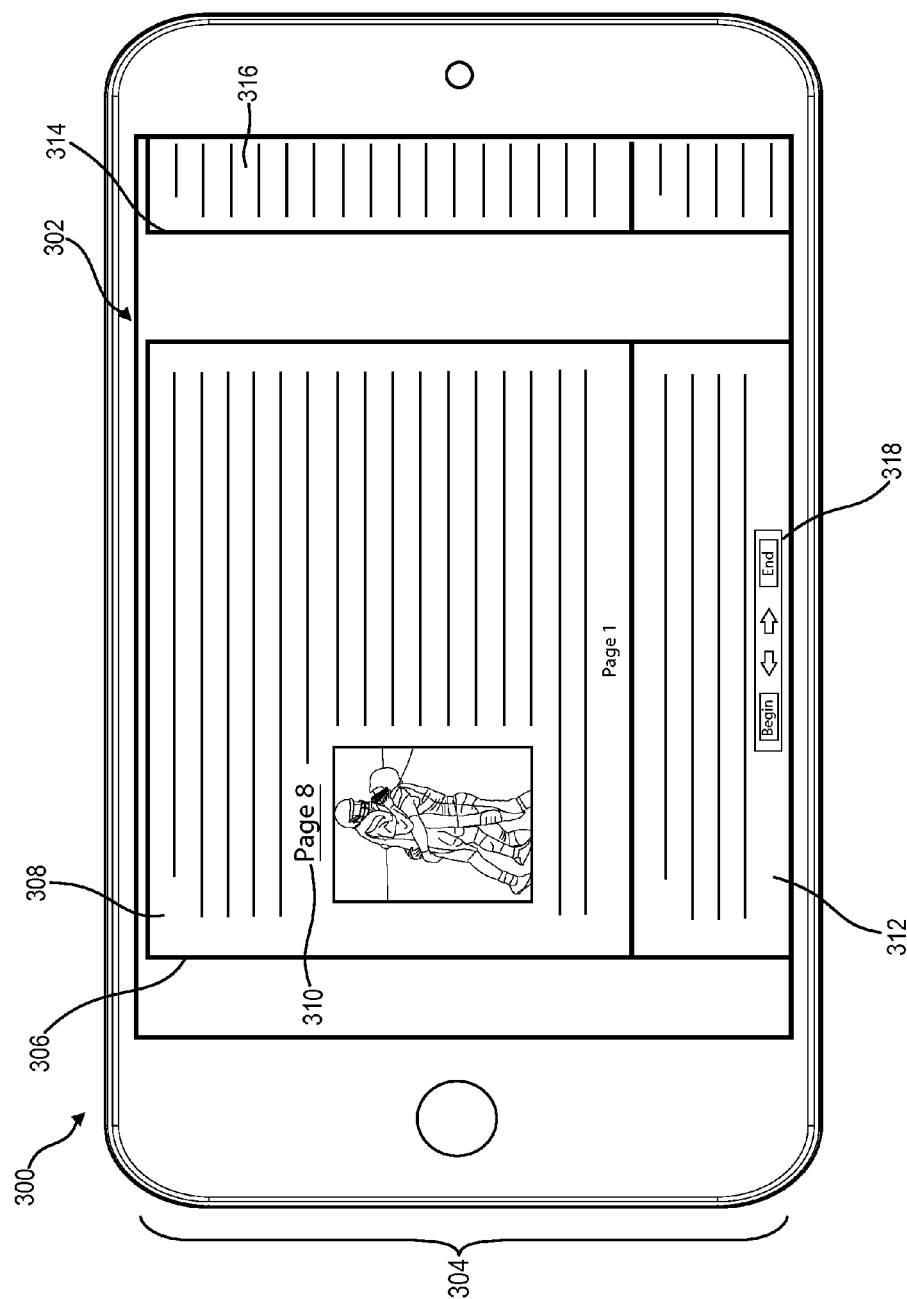
FIG. 3 illustrates a user interface for publishing a collection of digital articles in accordance with one or more embodiments.

Turning now to FIG. 3, additional detail will be provided with respect to one or more embodiments of the publishing system 101 that utilize a user interface to publish a collection of digital articles. For example, FIG. 3 illustrates a computing device 300 (e.g., a tablet) that is an example of a client device 104a described above. Thus, the computing device 300 may implement one or more components of the publishing system 101. The computing device 300 includes (or is associated with) a touch screen 302. Additionally or alternatively, computing device 300 may include any other suitable input device (e.g., a keypad, one or more input buttons, etc.). As shown, however, the publishing system 101 presents, via the touch screen 302, a user interface 304.

As illustrated in FIG. 3, the user interface 304 includes a variety of components, elements, and icons. For example, the user interface 304 displays, via the touch screen 302, an article 306 and a current page selected for display 308 from the article 306. The current page 308 includes a variety of digital content, for example, text, images, and a link 310. In other embodiments, the user interface 304 displays other elements, components, or features and can display electronic documents containing other electronic data, including video, GIFs, advertising content, or other data.

The publishing system 101 uses the user interface 304 to display a plurality of pages from a collection of articles. In particular, the user interface 304 allows navigation, in a vertical direction, through a series of consecutive pages from the article 306. The user interface 304 allows navigation, in a horizontal direction, through a series of additional articles containing additional pages. Thus, upon a first type of user interaction with the current page 308 (e.g., a vertical touch and drag gesture on the touch screen 302), the publishing system 101 can display a second page 312 in the article 306 (or some other subsequence page in the article 306). Similarly, upon a second type of user interaction with the current page 308 (e.g., a horizontal touch and drag gesture on the touch screen 302), the publishing system 101 can display a third page 316 in a second article 314.

In addition to gesture-based navigation, the user interface 304 provides other avenues to browse between pages and between articles within the collection of articles. For example, link 310 allows a user to navigate to another page in article 306. In particular, upon user interaction with link 310, the publishing system 101 will navigate directly to the eighth page in article 306. Thus, through link 310, a user can select page eight for display directly from the first page (i.e., current page 308) of article 306.

Furthermore, the user interface 304 also provides navigation bar 318. The navigation bar 318 provides further options for browsing the plurality of pages from the collection of articles. For example, the navigation bar 318 provides an option for a user to browse to the beginning of the collection of articles or to the end of the collection of articles. Accordingly, upon a user interaction with navigation bar 318, the publishing system 101 can display an end of the collection of articles from the current page 308 in the article 306.

Although FIG. 3 illustrates a certain configuration of pages and articles, it will be appreciated that the publishing system 101 can provide one or more electronic documents in a variety of configurations. The publishing system 101 can visually arrange a series of articles in a single vertical alignment, a single horizontal alignment, or some other combination of vertical and horizontal components. Alternatively or additionally, the publishing system 101 can arrange a series of pages and electronic documents so that they appear like the pages of a book or are otherwise visually arranged with consecutive pages behind (or in front of) other pages.

Similarly, although FIG. 3 illustrates particular elements of the user interface 304 (including contents of pages and navigation methods), it will be appreciated that the user interface 304 can include fewer or additional elements or navigation methods in alternative embodiments. For example, the user interface 304 optionally includes a search element that permits a user to navigate directly to a particular page or article. Similarly, the user interface 304 can include an element that permits a user to browse to the end of a particular article.

Regardless of the particular user interface elements, however, as discussed above, the publishing system 101 can assist in displaying pages as a user browses within one or more electronic documents. In particular, the publishing system 101 can utilize navigation information to identify a set of pages a user is likely to select for display, and prepare those pages for display. For example, FIGS. 4A-4D collectively illustrate representations of a sample collection of articles and pages wherein the publishing system 101 identifies a set of pages to select for display in accordance with one or more embodiments.

In particular, FIGS. 4A-4D illustrate representations of a plurality of pages in a collection of articles, such as the articles portrayed in FIG. 3. As illustrated, each of the representations signify a page in a collection of articles. These representations will be referred to herein either as representations or "pages" for simplicity of reference. For example, representation 1-1, illustrated in FIG. 4A, signifies a page (e.g., page 306) that can be displayed via computing device 300 through touchscreen 302 and user interface 304. Accordingly, representation 1-1 will also be referred to as page 1-1 herein.

It will be recognized that although FIGS. 4A-4D portray representations of pages in a particular manner, the representations are provided to illustrate operation of the publishing system 101, and are not limiting to a particular method of display, presentation, or operation. Indeed, although in one or more embodiments, the publishing system 101 portrays representations as shown in FIGS. 4A-4D as part of a user interface (e.g., user interface 304), the representations provided in FIGS. 4A-4D are provided for illustrative purposes to explain particular embodiments of the publishing system 101.

Figures 4A, 4B:
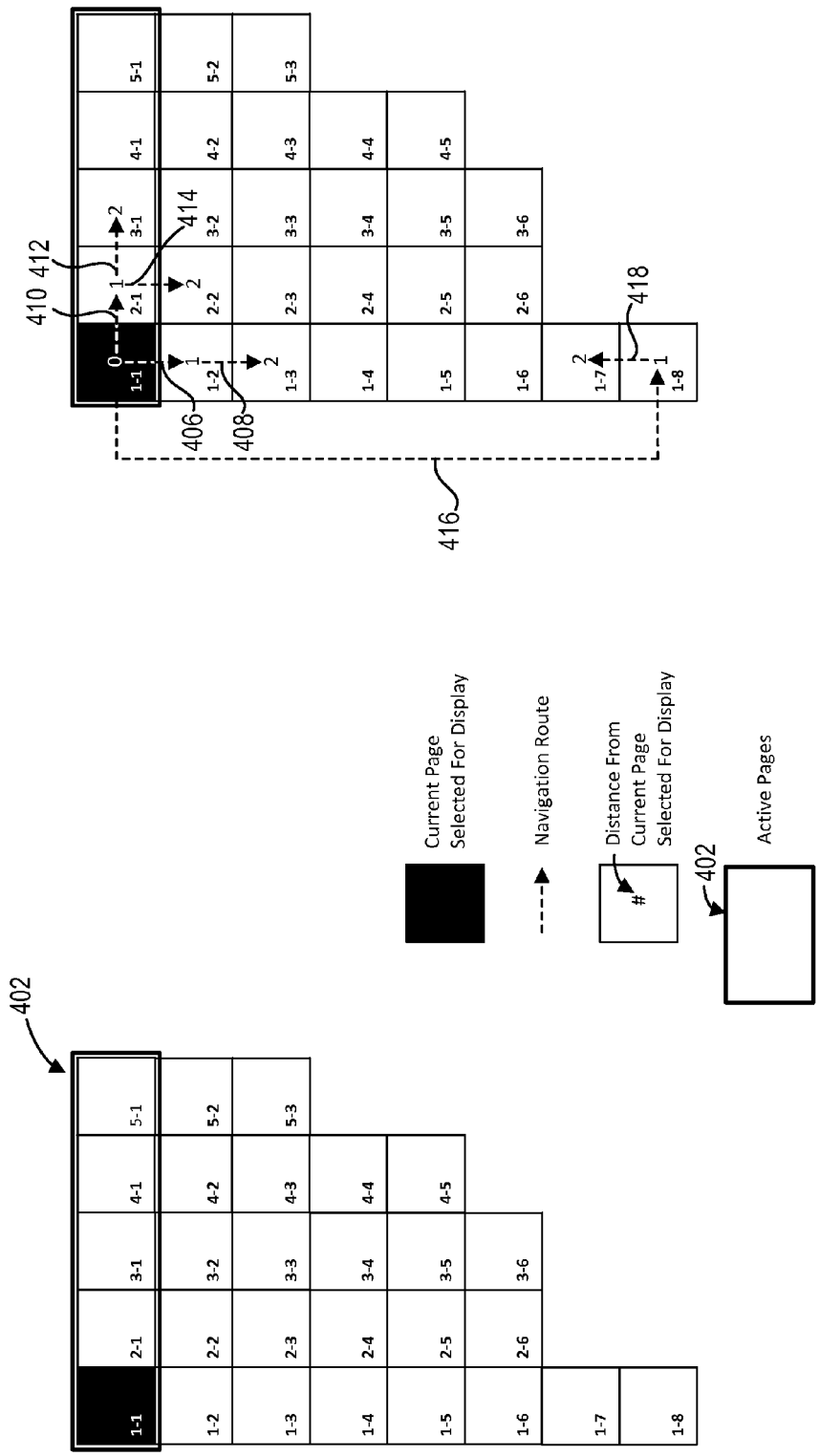
FIG. 4A illustrates a representation of a current page selected for display from a plurality of pages and a plurality of articles in accordance with one or more embodiments.
FIG. 4B illustrates a representation of a current page selected for display from a plurality of pages and a plurality of articles and distances from the current page in accordance with one or more embodiments.

For example, FIG. 4A illustrates representations of pages within five articles, the first article containing eight pages (i.e., pages 1-1 to 1-8) the second article containing six pages (i.e., pages 2-1 to 2-6), and so forth. As shown, page 1-1 is the current page selected for display. The current page selected for display is generally the current page that a user has browsed to via a user interface (e.g., user interface 304). For example, in one or more embodiments the page 308 shown in FIG. 3 would constitute the current page selected for display.

Although discussed generally herein as a single current page selected for display, in one or more embodiments a user can select multiple pages for display. For example, in one or more embodiments, the publishing system 101 adjusts the zoom level to display two or more pages at a time. Alternatively or additionally, in one or more embodiments the publishing system 101 provides multiple viewing windows, user interfaces, or other elements through which a user can view multiple pages at the same time. Accordingly, the publishing system 101 can identify, detect, or determine multiple current pages selected for display. To illustrate, with regard to FIG. 4A, in one or more embodiments the user selects pages 1-1, 1-2, and 1-3 for display at the same time.

The publishing system 101 can perform functions regardless of the number of current pages selected for display. In particular, if a user has selected multiple pages for display, the publishing system 101 can identify one or more additional pages likely to be selected for display based on the current pages selected for display. Furthermore, the publishing system 101 can utilize navigation information to identify one or more pages likely to be selected for display, calculate a priority order, calculate display criteria, calculate dropping criteria, and perform its other functions with regard to multiple current pages selected for display. The publishing system 101 can also calculate navigation routes and distances with regard to multiple current pages selected for display.

FIG. 4A also illustrates that the publishing system 101 can determine one or more active pages from a plurality of articles. As used herein, the term "active page" refers to a page in a particular article that the publishing system 101 will display when a user navigates to the particular article. The active page can be the first page in an article, the last page in an article, the page most recently selected for display in the article, a page viewed most frequently by other users or some other page. For example, active window 402 shows the active pages in each article in FIG. 4A, specifically, the first page in each article (e.g., pages 1-1, 2-1, 3-1, 4-1, and 5-1).

The active page for a particular article can change. For example, in one or more embodiments the publishing system 101 modifies the active page as a user navigates to different pages in an article. In particular, in one or more embodiments, if a user navigates to the third page in the first article (e.g., page 1-3) and then navigates to the first page in the second article (e.g., page 2-1), the publishing system 101 identifies the third page in the first article as the active page for the first article (e.g., page 1-3 is the active page for the first article). If the user navigates back to the first article, the publishing system 101 will display the active page (e.g., page 1-3). As discussed further below, the active page for an article can impact the navigation routes, distances, and pages most likely to be selected for display as calculated by the publishing system 101.

Indeed, as illustrated in FIG. 4B, the publishing system 101 can determine one or more navigation routes between one or more pages in one or more documents. In particular, the publishing system 101 has identified navigation routes 406, 410, and 416 from the current pages selected for display (i.e., page 1-1). Route 406 reflects a path from page 1-1 to page 1-2, particularly a path available to a user by navigating from page 1-1 to page 1-2 via a vertical touch and drag gesture. In addition, route 410 reflects a path from page 1-1 to page 2-1 (i.e., the active page in the second article), specifically, a path available to a user navigating from page 1-1 to page 2-1 via a horizontal touch and drag gesture. Similarly, route 416 reflects a path from page 1-1 to page 1-8 via a link embedded in page 1-1 (e.g., link 310). Furthermore, the publishing system 101 can detect other routes, for example routes 412 and 414 from the first page in the second article (page 2-1), route 408 from the second page in the first article (page 1-2) to the third page in the first article (page 1-3), route 418 from the eighth page in the first article (1-8) to the seventh page in the first article (1-7), and so forth.

As mentioned above, the active page in each article can impact the navigation routes between pages in different articles. For example, the navigation route 410 represents the route from the current page selected for display and the active page in the second article (page 2-1). In the event that the publishing system 101 modifies the active page for the second article to page 2-3—for example, if the last page selected for display within the second article was page 2-3—then the navigation route 410 would lead from page 1-1 (the current page selected for display) to page 2-3 (the active page in the second article).

Similarly, the current page selected for display can impact navigation routes, for example navigation routes between pages in different articles. Indeed, as just discussed, navigation route 410 represents the route between the current page selected for display and the active page in the second article. If the current page selected for display was actually page 1-3—for example, if the user navigates from page 1-1 to page 1-3—then the navigation route 410 would lead from page 1-3 (the current page selected for display) to page 2-1 (the active page in the second article). Thus, in one or more embodiments, user navigation and browsing within one or more electronic documents causes the publishing system 101 to recalculate one or more navigation routes.

The type and number of navigation routes calculated by the publishing system 101 can vary from embodiment to embodiment. In one or more embodiments, the publishing system 101 calculates all navigation routes between and among pages in one or more electronic documents. In other embodiments, the publishing system 101 calculates only the navigation routes within a certain distance of the current page selected for display. For example, as shown in FIG. 4B, the publishing system 101 has only calculated navigation routes for pages within two pages of the current page selected for display. In other embodiments, the publishing system 101 calculates navigation routes for pages within a certain distance of the current page and for certain additional pages (e.g., the pages most frequently selected for display, the pages that take longest to prepare for display). The publishing system 101 can select which navigation routes to calculate based on criteria, features of one or more pages, features of one or more electronic documents, previous navigation history, or other navigation information.

Furthermore, as previously mentioned, the publishing system 101 can calculate one or more distances between pages in one or more electronic documents. FIG. 4B illustrates one method of calculating distance between one or more pages, i.e., calculating a distance based on the pages traversed along one or more navigation routes. In particular, FIG. 4B shows that page 2-1 is a distance of 1 page away from page 1-1 based on the fact that page 2-1 is one page away along navigation route 410. Similarly, FIG. 4B shows that page 1-3 is a distance of two pages away from the current page selected for display along navigation routes 406 and 408 and page 1-7 is a distance of two pages away along navigation routes 416 and 418.

Although shown in terms of pages, the publishing system 101 can calculate distance in a variety of ways. For example, the publishing system 101 can calculate distance in terms of the amount of text, data, figures, or other information a user would need to browse through to navigate to another page. In particular, the publishing system 101 can calculate distance based on the words contained in each page along a navigation route between the current page selected for display and another page.

The publishing system 101 can calculate a variety of navigation routes and distances. Although FIG. 4B illustrates one embodiment where the publishing system 101 has calculated the shortest navigation route and the shortest distance between the current page selected for display and one or more other pages, the publishing system 101 can calculate other navigation routes and other distances. For example, although page 1-7 is shown as a distance of two pages from page 1-1, the publishing system 101 could also calculate a distance of six pages along a different navigation route (e.g., a route moving along pages 1-2, 1-3, 1-4, 1-5, 1-6, and 1-7). Thus, the publishing system 101 can calculate a shortest distance, a longest distance, and a variety of other distances between one or more pages.

Thus, in one or more embodiments, the publishing system 101 calculates an average distance. To illustrate the publishing system 101 calculates the shortest distance between the current page selected for display and a particular page and the next shortest distance between the current page selected for display and the particular page. In this manner, the publishing system 101 differentiates pages that have multiple short navigation routes to the current page selected for display. In other embodiments, the publishing system 101 calculates some other average distance (e.g., average of the three shortest distances, average of all distances, etc.).

In addition to calculating navigation routes and distances, the publishing system 101 can also identify one or more pages to prepare for display. For example, the publishing system 101 can determine one or more pages to prepare for display by establishing display criteria. In particular, FIG. 4C indicates a set of pages 420 identified as pages to prepare for display (i.e., pages 1-2, 1-3, 1-7, 1-8, 2-1, 2-2, and 3-1) based on display criteria applied to a collection of articles. Specifically, in FIG. 4C the publishing system 101 has established display criteria consisting of all pages within a distance of two pages of the current page selected for display.

FIG. 4C illustrates one embodiment of the publishing system 101 identifying pages that satisfy display criteria. In particular, with regard to FIG. 4C the publishing system 101 calculates a distance between the current page selected for display and each page in the plurality of articles (e.g., by calculating distances along the shortest navigation routes between the current page selected for display and each page in the plurality of pages), and identifies the pages that are two pages or fewer from the current page selected for display. Because pages 1-2, 1-3, 1-7, 1-8, 2-1, 2-2, and 3-1 fall within two pages of page 1-1, the publishing system 101 identifies those pages to prepare for display.

The publishing system 101 can establish display criteria related to any measurable characteristic or feature. As previously discussed, the publishing system 101 can establish display criteria related to the number of pages along one or more navigation routes between a current page selected for display and another page. The publishing system 101 can also establish display criteria related to other distances (such as the number of words or the amount of data between locations within an electronic document).

In addition to distances, in one or more embodiments the publishing system 101 establishes criteria related any other measurable characteristics. For example, the publishing system 101 establishes display criteria related to features or characteristics of one or more pages or features or characteristics of one or more electronic documents. For example, the publishing system 101 establishes display criteria related to the type of content contained (e.g., prepare for display documents containing images), related to subject matter (e.g., prepare for display articles related to sports), related to size (e.g., prepare display documents within a certain distance that exceed a certain size), related to location relative to other articles or pages, or related to other characteristics or features.

In one or more embodiments, the publishing system 101 employs criteria consisting of a single rule or multiple rules (in isolation or in combination). For instance, the publishing system 101 can establish one set of criteria for documents containing figures or images (e.g., prepare for display documents containing images when they are within four pages of the current page selected for display) and can establish another set of display criteria for documents that do not contain figures or images (e.g., prepare for display documents that do not contain images when they are within two pages of the current page selected for display).

In addition, in one or more embodiments the publishing system 101 distinguishes between differences types of navigation routes. For example, the publishing system 101 identifies categories of navigation routes between consecutive pages in the same article, routes between pages in different articles, routes between pages via a link, or other types of navigation routes. Accordingly, the publishing system 101 can also establish different criteria based on the type of navigation route. For example, the publishing system 101 establishes display criteria based on the type of navigation route. To illustrate, the publishing system 101 can establish display criteria that prepares for display all pages (1) within five pages of the current page selected for display within the same article, (2) within three pages of the current page selected for display in a different article, and (3) within one page of the current page selected for display where the page is available via hyperlink.

Furthermore, as shown in FIG. 4D, the publishing system 101 can also calculate different distances based on different navigation routes. FIG. 4D illustrates an embodiment where the publishing system 101 adjusts the distance for navigation routes between different articles. In particular, in FIG. 4D, the publishing system 101 assigns a distance of two pages where the navigation route bridges pages in two different articles and a distance of one page where the navigation route bridges pages in the same article. As illustrated, such an approach results in identifying fewer pages for display in surrounding articles relative to the pages in the current article. Thus, the publishing system 101 can emphasize certain navigation routes for display and de-emphasize other navigation routes in identifying a set of documents to prepare for display.

Although FIG. 4D illustrates an embodiment of the publishing system 101 utilizing a distance of two pages for navigation routes between pages located in different articles, the publishing system 101 can calculate a variety of different distances for a variety of different navigation routes. For example, the publishing system 101 can add, subtract, multiply, divide, or otherwise manipulate a first distance associated with a first navigation route to calculate a second distance associated with a second navigation route. For instance, the publishing system 101 can calculate a distance for navigation routes between pages in multiple articles as one hundred more pages away than navigation routes between pages in the same article. Similarly, the publishing system 101 can calculate a distance for navigation routes between pages connected by links as ten times the distance for navigation routes between pages in multiple articles.

Moreover, in one or more embodiments, the publishing system 101 ignores or filters some navigation routes. For example, if the publishing system 101 includes a browsing element that permits a user to navigate to any page within one or more documents at any time, the publishing system 101 may ignore navigation routes available through the browsing element to avoid loading excess pages. Alternatively or additionally, in circumstances where a common navigation route exists for all pages, the publishing system 101 calculates an average distance (e.g., based on the shortest and next shortest distance between the current page selected for display and a particular page). Utilizing an average can allow the publishing system 101 to effectively filter out a common navigation route.

As mentioned previously, in one or more embodiments, the publishing system 101 identifies one or more pages likely to be selected for display based on navigation information. FIGS. 5A-5D illustrate additional embodiments of the publishing system 101 that utilize navigation information to identify one or more pages likely to be selected for display. Specifically, FIG. 5A illustrates representations of a plurality of pages in a collection of articles where the user has navigated from the first page (page 1-1) to the third page (page 1-3) in the same article.

The publishing system 101 can detect the navigation direction (e.g., down in FIG. 5A) and identify one or more pages likely to be selected for display based on the navigation direction. In one or more embodiments, the publishing system 101 generates one or more display criteria based on the navigation direction. For example, as illustrated in FIG. 5A, based on the navigation direction, the publishing system 101 has generated display criteria that prepares all pages for display that are within four pages of the current page selected for display in the navigation direction (e.g., down), within three pages of the current page selected for display in the direction opposite the navigation direction (e.g., up), and otherwise within two pages of the current page selected for display.

The publishing system 101 can calculate a variety of navigation directions. For example, the publishing system 101 can calculate the navigation direction based on the most recent browsing movement from one page to another page. In other embodiments, the publishing system 101 calculates the navigation direction based on a number of recent browsing movements. To illustrate, if a user browses in one direction within the same article and then browses to another article, the publishing system can calculate a navigation direction based on both movements. In particular, if a user browses down and then to the right, the publishing system 101 may calculate a navigation direction that is down and to the right.

The publishing system 101 can also detect the navigation rate (e.g., the speed at which the user moves from page 1-1 to page 1-3) and identify one or more pages likely to be selected for display (e.g. establish display criteria) based on the navigation rate. For example, with regard to the embodiment illustrated in FIG. 5A, upon determining that a user has browsed from page 1-1 to page 1-3 at a certain rate, the publishing system 101 establishes or modifies display criteria. More specifically, with regard to FIG. 5A a rapid navigation rate from page 1-1 to page 1-3 causes the publishing system 101 to establish display criteria that prepares all pages for display that are within five pages of the current page selected for display in the navigation direction and within one page of the current page selected for display in the direction opposite the navigation direction.

In one or more embodiments, the publishing system 101 can calculate the navigation rate in a variety of ways. For example, the publishing system 101 calculates the navigation rate based on the amount of time taken for the user to navigate between the two most recent pages selected for display. In other embodiments, the publishing system 101 calculates the navigation rate based on the average time taken for the user to navigate between three or more pages. For instance, the publishing system 101 can identify the number of pages a user has selected for display in a particular direction (e.g., page 1-1, 1-2, and 1-3) and divide by the amount of time taken for the user to browse between the pages. In yet other embodiments, the publishing system 101 can calculate the navigation rate based on the time taken to browse all pages selected for display.

Figure 5B:
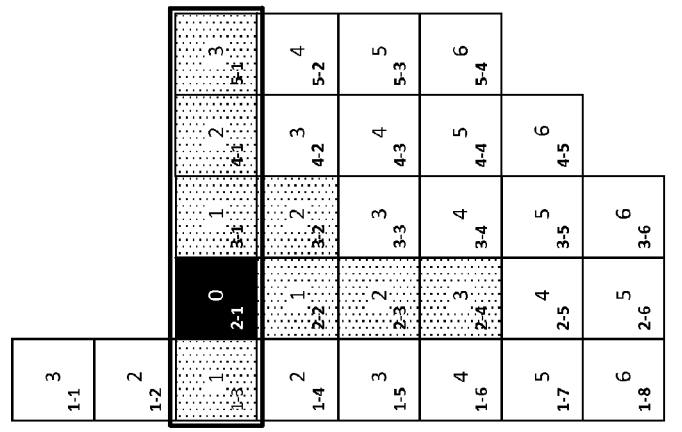
FIG. 5B illustrates a representation of a current page selected for display from a plurality of pages and a plurality of articles, distances from the current page, and pages identified to prepare for display in accordance with one or more embodiments.
Figure 5A:
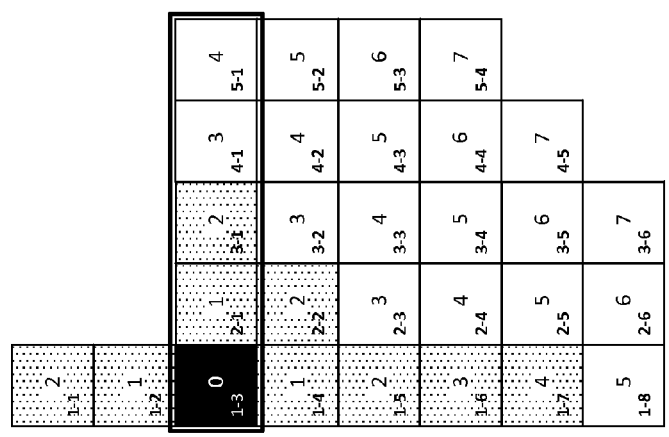
FIG. 5A illustrates a representation of a current page selected for display from a plurality of pages and a plurality of articles, distances from the current page, and pages identified for to prepare for display in accordance with one or more embodiments.

For example, in FIG. 5B a user has navigated to the right (from page 1-3 to page 2-1) after navigating down (from page 1-1 to page 1-3). The publishing system 101 can detect both navigation directions (e.g., down and to the right) and both navigation rates (e.g., the navigation rate in browsing down and the navigation rate in browsing right) and establish criteria based on the navigation information (e.g., display criteria such that pages will be selected for display that are within three pages of the current page selected for display to the right, within three pages of the current pages selected for display in the downward direction, and otherwise within two pages of the current page selected for display).

The publishing system 101 can detect, identify, determine or calculate one or more vertical navigation rates one or more horizontal navigation rates, one or more vertical navigation directions, one or more horizontal navigation directions, a combined navigation direction, or a combined navigation rate. Thus, for example, the publishing system 101 can determine that a user navigates within a particular article at a first rate (e.g., a user slowly reads articles of interest) but that the user navigates quickly across articles (e.g., user navigates quickly until finding an article of interest). The publishing system 101 can establish criteria based on such navigation information.

Also, as discussed previously, the publishing system 101 can calculate one or more navigation routes and/or one or more distances as one or more active pages change during browsing of multiple electronic documents. As shown in FIG. 5B, the user has navigated from page 1-1 to page 1-3 to page 2-1. In this particular embodiment, the publishing system 101 identifies page 1-3 as the active page within the first article (i.e., the last page selected for display from the first article). Moreover, as shown, the publishing system 101 has calculated the distance from page 2-1 to 1-3 as one page away because, in this particular embodiment, when the user navigates back to the first article, page 1-3 will be selected for display.

As discussed, the publishing system 101 can generate, establish, calculate, identify, or set criteria (e.g., display criteria or dropping criteria). The publishing system can establish criteria based on a variety of factors, including, but not limited to: navigation information, the current page selected for display, features or characteristics of the client device, features or characteristics of one or more pages, features or characteristics of one or more electronic documents, or other information.

For example, with regard to features or characteristics of the client device, the publishing system 101 can establish criteria based on the type of device, the operating system, the amount or type of memory, the processor, characteristics of a display device associated with the client device, or other features or characteristics of the client device. For example, based on a determination that the client device has a processor and memory capable of processing and loading significant amounts of data over a short amount of time, the publishing system 101 can establish display criteria that will prepare more pages for display than for a client device that has a processor and memory incapable of processing and loading similar amounts of data.

In addition, the publishing system 101 can generate criteria in a variety of ways. In one or more embodiments the publishing system 101 utilizes an algorithm to identify criteria based on a variety of variables. For example, in one or more embodiments the publishing system 101 utilizes an algorithm that associates one or more criteria with one or more variables, detects the variables, and establishes the criteria through the algorithm. Although exemplary methods for calculating criteria are provided herein, it will be appreciated that the publishing system 101 can utilize any method or system to establish criteria, and the specific embodiments disclosed are provided as illustrative, not limiting, alternatives.

To illustrate, in one or more embodiments, the publishing system 101 utilizes an algorithm that generates one or more distances based on a navigation direction and a navigation rate. In particular, in one or more embodiments, the publishing system 101 establishes a multiplier to convert navigation rate to one or more distances. For example, the publishing system 101 can have a default distance of three pages in the navigation direction, but increase the pages in the navigation direction as a function of increased speed in the navigation direction (e.g., 1 additional page in the navigation direction for every additional page per second of navigation rate in the navigation direction).

Furthermore, the publishing system 101 can optionally utilize a database or look-up table that defines criteria based on a variety of factors. For instance, a look-up table can define one or more criteria to apply based on detected variables. In particular, a look-up table can define one or more distances based on a range of navigation rates (e.g., a distance of five pages for a navigation rate ranging from 0.5 to 1 pages per second, but a distance of six pages for a navigation rate ranging from 0.5 to 1 pages per second).

Although the previous example involves navigation rate and navigation direction, it will be appreciated that the publishing system 101 can utilize an algorithm or otherwise generate criteria based on any type of navigation information or other information. For example, the publishing system 101 can utilize an algorithm that analyzes prior user history in browsing one or more documents to establish criteria. Similarly, as just discussed, the publishing system 101 can analyze the features of or characteristics of a computing device (e.g., computing device 300 or client devices 104a-104n) to establish criteria.

Furthermore, the publishing system 101 can utilize an algorithm that rates and/or weighs navigation information or other information to establish criteria. For example, the publishing system 101 can detect a navigation rate, a navigation direction, prior user history, and one or more characteristics of a computing device. The publishing system 101 can then rank and/or weight the sources of information (e.g., navigation direction highest priority, navigation rate next highest priority, prior user history next highest priority, and characteristics of the computing device next highest priority). The publishing system 101 can then utilize the ranked/weighted information to establish criteria (e.g., select criteria that emphasize navigation direction and navigation rate over user browser history).

As discussed previously, the publishing system 101 can calculate, generate, or establish criteria (e.g., display criteria) based on navigation information related to how individuals have previously navigated one or more electronic documents. For example, FIG. 5C illustrates representations of a plurality of pages in a collection of articles where the publishing system 101 identifies pages likely to be selected for display based on information regarding how one or more users have previously navigated the collection of articles.

Specifically, FIG. 5C illustrates that a user has browsed to page 3-1. In this particular embodiment, the publishing system 101 detects that one or more previous users have navigated to page 3-1 in the collection of articles and have immediately read the remainder of the third article (i.e., pages 3-2, 3-3, 3-4, 3-5, and 3-6). Accordingly, the publishing system 101 establishes criteria that emphasize the remainder of the pages in the third article. For example, the publishing system 101 can establish display criteria that prepares all pages for display that are (1) within five pages of the current page selected for display if those pages are within the same article as the current page selected for display or (2) within one page of the current page selected for display if those pages are not within the same article. As shown, based on the navigation information this approach focuses the pages to prepare for display on those pages that are contained within the third article and nearest to the current page selected for display.

The publishing system 101 can utilize a variety of analytical data as navigation information. For example, the publishing system 101 can collect and utilize information regarding one or more electronic documents a user selects for display, electronic documents a user selects in their entirety, one or more pages a user selects for display, user interactions within one or more electronic documents (e.g., clicks, touch gestures, or user interaction with elements within one or more electronic documents), advertisements displayed, user interaction with advertisements, browsing order, user ratings (e.g., ratings of articles, pages, collections, etc.), popularity measures, user interests, features or characteristics of a user (e.g., user demographic information), features or characteristics of a device (e.g., device type, browser type, etc.), or other information.

Navigation information regarding how users have browsed one or more electronic documents can be general to all users, specific to a sub-category of users, or specific to an individual user. For example, analytical data can indicate that all users tend to browse a collection of articles in a particular manner. To illustrate, data can indicate users tend to read a first article in a collection of articles, skip a second article, and read a first half of a third article. The publishing system 101 can utilize such information to establish criteria (e.g., display criteria).

Additional or alternatively, analytical data can be specific to a sub-category of users. In particular, navigation information can relate to how a sub-category of users tend to browse one or more electronic documents. To illustrate, navigation information can indicate that men tend to browse to a first article in a collection of articles and women tend to browse to a second article in a collection of articles. Similarly, navigation information can indicate that users with particular interests or characteristics (e.g., sports fans) tend to browse one or more electronic documents in a particular manner.

Similarly, the publishing system 101 can identify navigation information based on analytical data related to a particular user. For instance, the publishing system 101 can detect user history indicating how a particular user navigates one or more electronic documents. For example, the publishing system 101 can identify navigation information based on a user's particular interests, browsing habits, reading habits, or other characteristics. To illustrate, the publishing system 101 can determine that a user tends to read the first few pages in an article and then move along to other articles. Similarly, the publishing system 101 can determine that a user tends to read all articles of a particular genre, category, topic, or other feature (e.g., user reads all articles related to politics).

In addition, the publishing system 101 can utilize anticipated information regarding how one or more users will browse one or more documents. For example, navigation information can include information regarding how an author, operator, program, individual, service, or other source anticipates that users will likely browse one or more electronic documents. To illustrate, the author of an article can anticipate that users (or a sub-category of users) will find a particular article interesting, and thus, that users will tend to browse to that particular article.

In addition to user history or analytical data, navigation information can include any type of information bearing on browsing one or more pages or one or more electronic documents a user is likely to select for display. For example, navigation information can be based on the features or characteristics of one or more pages, the features or characteristics of one or more electronic documents, features or characteristics of a client device, or other information.

For instance, the publishing system 101 can utilize the size or contents of one or more electronic documents or one or more pages as navigation information. For example, in one or more embodiments, the publishing system 101 determines that a page contains an advertisement, a high-quality image, a high-volume text, or other content and utilizes that information as navigation information in establishing criteria. The publishing system 101 can also determine that a page contains a large volume of data and utilize that information as navigation information. Similarly, in one or more embodiments the publishing system 101 determines the time required to prepare a particular page for display (e.g., load the page, convert a PDF to a PNG, and/or download the page) and utilize that information as navigation information.

Similarly, the publishing system 101 can establish criteria based on the number of routes, links, or connections to one or more pages or one or more documents. For instance, the publishing system can identify a page that is connected to numerous other pages through links and/or other navigation routes. In one or more embodiments, the publishing system 101 establishes criteria based on the number of navigation routes to or from the page.

The publishing system 101 can also utilize a user's navigation history within a particular electronic document as navigation information. In particular, the publishing system 101 can utilize pages previously selected for display to establish criteria. For example, FIG. 5D illustrates representations of a plurality of pages in a collection of articles where the publishing system 101 identifies one or more pages to prepare for display based on pages previously selected for display. In particular, in FIG. 5D the user began on the first page of the first article 1-1 and then navigated to the second page 1-2, then the third page 1-3, then the first page of the second article 2-1, then the first page of the third article 3-1, and then the second page of the third article 3-2 before navigating to the current page selected for display, page 3-3. The publishing system 101 can establish criteria based on this navigation information; for example, as illustrated, establish display criteria that exclude pages previously selected for display not contained in the same article as the current page selected for display (e.g., exclude pages 1-1, 1-2, 1-3, and 2-1 because they were previously viewed and not in the same article).

Figure 6B:
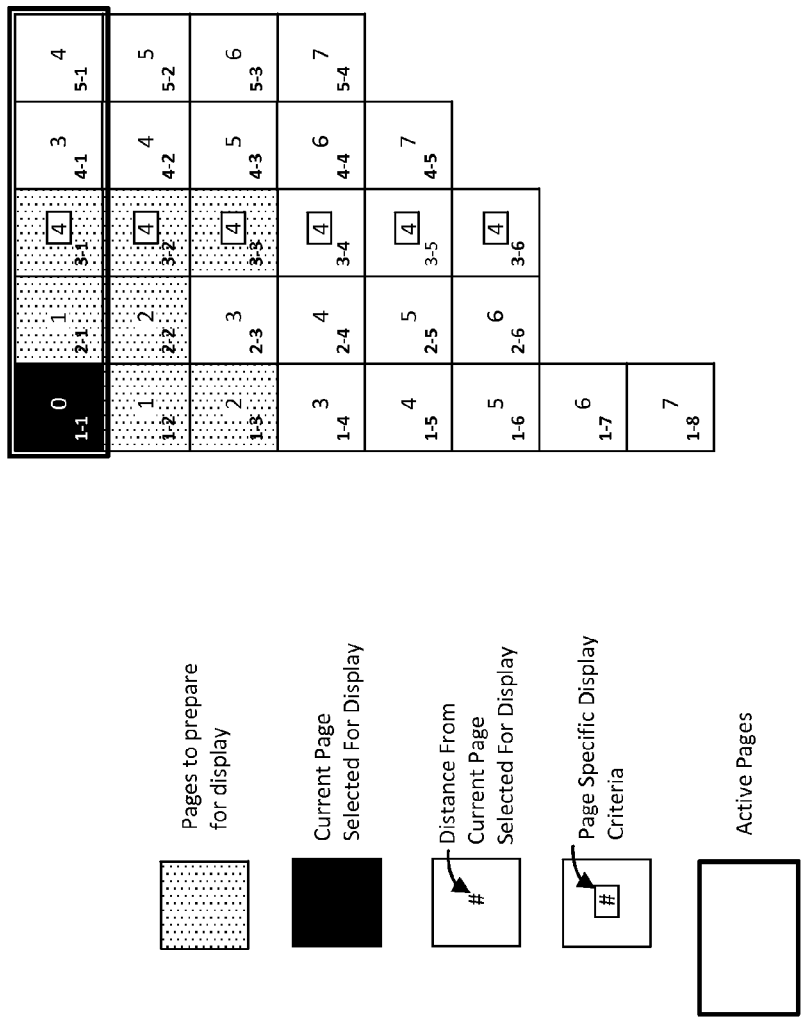
FIG. 6B illustrates a representation of a current page selected for display from a plurality of pages and a plurality of articles and pages identified to prepare for display in accordance with one or more embodiments.
Figure 6A:
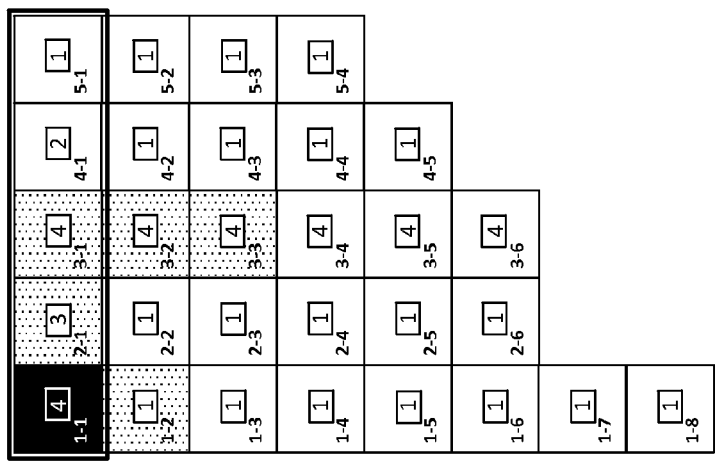
FIG. 6A illustrates a representation of a current page selected for display from a plurality of pages and a plurality of articles and pages identified to prepare for display in accordance with one or more embodiments.

As mentioned previously, the publishing system 101 can utilize navigation information to establish criteria generally, or to establish criteria related to one or more specific pages. For example, FIG. 6A illustrates representations of a plurality of pages in a collection of articles where the publishing system 101 has established page-specific criteria for each page in the plurality of pages. For purposes of the figures herein (including FIG. 6A) numbers included within a small box indicate page-specific criteria.

The publishing system 101 can establish page-specific criteria utilizing navigation information or any other information or methodology described herein. Similarly, page-specific criteria can include any of the criteria discussed herein. For example, page-specific criteria can include one or more distances from a current page selected for display.

Indeed, as shown in FIG. 6A the publishing system 101 has established display criteria for each page comprising a distance from the current page selected for display. For example, the publishing system 101 has generated display criteria for page 2-1 such that the publishing system 101 will prepare page 2-1 for display when the current page selected for display is within three pages of page 2-1. As shown, page 2-1 satisfies these criteria (page 2-1 is within one page of the current page selected for display) and, accordingly, the publishing system 101 identifies page 2-1 as a page to prepare for display. On the other hand, the publishing system 101 has established criteria for page 1-3 such that the publishing system 101 will prepare page 1-3 for display when it is within one page of the current page selected for display. As shown, page 1-3 does not satisfy these criteria (page 1-3 is two pages away from the current page selected for display).

As described above, the publishing system can establish criteria, including page-specific criteria, based on navigation information or any other information. For example, with regard to FIG. 6A, the publishing system 101 has determined that the third article (i.e., pages 3-1 to 3-6) are the most popular articles in the collection of articles and that users tend to navigate to the third article more frequently than other pages in the article. Accordingly, the publishing system 101 establishes broader display criteria (e.g., a larger distance) so that the publishing system 101 will prepare those pages for display further in advance relative to other pages in the collection of articles. Similarly, the publishing system 101 has determined that users quickly lose interest after reading the third article, and thus, rarely read past the first page in the fourth article. Accordingly, the publishing system 101 establishes narrow display criteria (e.g., a smaller distance) for each page in the fifth article (e.g., pages 5-1, 5-2, 5-3 and 5-4).

Although illustrated in FIG. 6A as applicable to specific pages, in one or more embodiments, the publishing system 101 establishes criteria to a group of pages. For example, the publishing system 101 can create a set of criteria for all pages within a particular article, a subset of pages within an article, a subset of pages from multiple articles, or any other category of articles. To illustrate, the publishing system 101 can create a set of criteria for the five most popular pages in an article, the five pages that take the longest to load, or some other category of pages.

In one or more embodiments the publishing system 101 also utilizes both general and page-specific criteria in the same embodiment. For example, FIG. 6B illustrates representations of a plurality of pages in a collection of articles where the publishing system 101 establishes both general and page-specific criteria according to one or more embodiments. As illustrated, in this particular embodiment the publishing system 101 utilizes general criteria for all pages except for the pages in the third article (i.e., pages 3-1, 3-2, 3-3, 3-4, 3-5, and 3-6). Specifically, the publishing system 101 establishes general criteria such that the publishing system 101 prepares for display all pages within two pages of the current page selected for display. With regard to the pages in the third article, the publishing system 101 has assigned separate criteria such that the publishing system 101 will prepare pages for display when they fall within four pages of the current article.

In addition to identifying a set of pages likely to be selected for display, in one or more embodiments the publishing system 101 also determines a priority order for preparing one or more pages to display. The publishing system 101 sorts pages according to the priority order. Moreover, the publishing system 101 can prepare pages for display according to the priority order.

For example, FIG. 7A illustrates an embodiment with a representation of a plurality of pages in a collection of documents where the publishing system 101 determines a priority order for a set of pages identified as likely to be selected for display. In particular, the publishing system 101 has identified pages 1-3, 2-1, 2-2, 2-3, 3-1, 3-2, 3-3, 3-4, 3-5, 4-1, 4-2, and 5-2 as pages to prepare for display.

The publishing system 101 determines a priority order for preparing one or more pages to display based on the current page selected for display. For example, in one or more embodiments, the publishing system determines a priority order based on one or more distances from the current page selected for display. In particular, the publishing system 101 sets the priority order in order of distance from the current page selected for display.

As discussed previously, and as shown in FIG. 7A, in one or more embodiments the publishing system 101 calculates distances differently depending on navigation routes. Specifically, the publishing system 101 determines priority by assigning different distances based on different navigation routes. In FIG. 7A, the publishing system 101 calculates distances along navigation routes between pages within the same article as a distance of 1 page, but calculates distances along navigation routes between pages in different articles as a distance of 100 pages. In this manner, the publishing system 101 can emphasize loading pages within the same article as the current page selected for display before pages in other articles. Thus, as shown, the publishing system 101 in this particular embodiment establishes a priority order as follows: page 3-3 (distance of 0); then page 3-2 and page 3-4 (distance 1); then page 3-1 and 3-5 (distance of 2); then pages 2-2 and 4-1 (distance of 100); then pages 2-1, 2-3, and 4-2 (distance of 102); and then pages 1-3 and 5-2 (distance of 200).

The publishing system 101 can also establish priority order based on any navigation information. For example, the publishing system 101 establishes a priority based on the pages most likely to be selected for display. In particular, in the particular embodiment illustrated in FIG. 7B, the publishing system 101 detects that a user has navigated to the current page selected for display by navigating down and right (e.g., beginning at page 1-1 and moving to page 3-3). Based on the navigation information, the publishing system 101 can emphasize pages below the current page selected for display, then emphasize other pages in the current article, then move to pages to the right, then pages to left, etc. Thus, as shown in FIG. 7B, the publishing system establishes the priority order as 3-3, then 3-4 (down), then 3-5 (down), then 3-2 (same article, up), then 3-1 (same article, up), then 4-1 (right), then 4-2 (same article), then 5-2 (right), then 2-2 (left), then 2-2 (same article, down), then 2-3 (same article), and then 1-3 (left).

Although just described in terms of navigation direction, the publishing system 101 can establish priority order based on any navigation information (or other information), including navigation direction, navigation rate, information regarding how one or more users have previously navigated one or more electronic documents, the features or characteristics of one or more electronic documents, or other information bearing on the pages most likely to be selected for display.

Moreover, in one or more embodiments the publishing system 101 also modifies a priority order. For example, in the event that a user navigates from one page to another in a plurality of articles, the publishing system 101 can modify the priority order as a user navigates. In one or more embodiments, the publishing system 101 may identify a new set of pages to prepare for display, detecting navigation information, and identify a new priority order.

Moreover, in one or more embodiments the publishing system 101 takes into consideration pages that have already been prepared for display. For instance, in one or more embodiments, the publishing system 101 determines a priority order based on pages that have previously been prepared for display. For example, the publishing system 101 identifies a set of pages previously prepared for display and compares the set of pages previously prepared for display with a set of pages identified to prepare for display. The publishing system 101 can identify adjust the priority order based on this comparison, for example, by removing pages from the priority order that have already been prepared for display.

In one or more embodiments, the publishing system 101 establishes a priority order based on a set of pages previously prepared for display when a user navigates from one page to another page before the publishing system 101 has prepared all pages for display that the publishing system 101 had identified as pages to prepare for display. In such a circumstance, the publishing system 101 identifies what pages have been prepared for display, identifies a new set of pages to prepare for display, compares the pages that have been prepared for display with the new set of pages to prepare for display, identifies pages from the set of pages to prepare for display that have not already been prepared for display, identifies navigation information, and/or determine a priority order for the pages from the set of pages to prepare for display that have not already been prepared for display.

The publishing system 101 can modify a priority order utilizing a variety of methods. In addition to the method just described, in other embodiments the publishing system 101 identifies pages added to or subtracted from the set of pages identified to be prepared for display (e.g., pages added as a user browses to a new page). Upon addition to or subtraction from the set of pages identified to be prepared for display, the publishing system 101 establishes a new priority order. For example, the publishing system 101 can identify new navigation information and establish a new priority order based on the navigation information and the set of pages identified to be prepared for display.

In addition to establishing a priority order, the publishing system 101 can also identify one or more pages to drop. Indeed, although illustrated and discussed generally with regard to FIGS. 3A to 7B in terms of display criteria or priority order, the capabilities of the publishing system 101 discussed with regard to establishing criteria or utilizing navigation information apply equally to dropping criteria. For example, FIGS. 8A-8B display representations of a plurality of pages in a collection of articles where the publishing system 101 identifies pages to prepare for display in accordance with one or more embodiments. Specifically, with regard to FIG. 8A, the publishing system 101 has identified a set of pages to display (e.g., 2-2, 3-2, 3-3, 3-4, and 4-1) based on the following display criteria: all pages within one page of the current article selected for display.

Figures 8A, 8B:
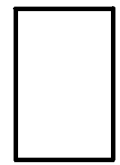
FIG. 8A illustrates a representation of a current page selected for display from a plurality of pages and a plurality of articles and a set of pages prepared for display or to be prepare for display in accordance with one or more embodiments.
FIG. 8B illustrates a representation of a current page selected for display from a plurality of pages and a plurality of articles and a set of pages prepared for display or to be prepared for display in accordance with one or more embodiments.

In FIG. 8B, however, after the publishing system 101 has prepared pages 2-2, 3-2, 3-3, 3-4, and 4-1 for display, the user has navigated from page 3-3 to page 4-1. Utilizing the same display criteria, the publishing system 101 identifies another set of pages to prepare for display, namely pages 3-3, 4-1, 4-2, and 5-2. However, the publishing system 101 has already prepared pages 2-2, 3-2, and 3-4 for display. In one or more embodiments, the publishing system 101 analyzes the pages previously prepared for display to determine which pages to drop. In this manner, the publishing system 101 can avoid having to waste the time and computing resources required to re-prepare pages for display, while limiting the number of pages prepared for display to avoid over-taxing computing resources.

In particular, in one or more embodiments, the publishing system 101 establishes dropping criteria. The dropping criteria can be separate and distinct from other criteria (e.g., display criteria). For example, the publishing system 101 can establish dropping criteria comprising one or more distances (e.g., one or more distances from the current page selected for display). To illustrate, with regard to FIG. 8B, the publishing system 101 establishes dropping criteria such that the publishing system 101 will drop all pages previously loaded that are not within two pages of the current page selected for display. Thus, even though pages 2-2, 3-2, and 3-4 do not fall within the display criteria for this particular example, the publishing system 101 will leave pages 2-2, 3-2, and 3-4 prepared for display based on the dropping criteria.

Like other criteria, the publishing system 101 can establish dropping criteria based on navigation information or other information. The publishing system 101 can establish dropping criteria based on any type of navigation or any other information described with regard to establishing other criteria within the publishing system 101.

For example, the publishing system 101 can establish dropping criteria based on navigation information. In particular, with regard to FIGS. 8A and 8B, the publishing system 101 determines that the user navigated from page 3-3 to page 4-1, and based on that navigation information (i.e., navigation direction), establishes different dropping criteria. For example, the publishing system 101 can establish dropping criteria that drops all pages except those pages within three pages of the current page selected for display in the navigation direction, within two pages of the current page selected for display in the direction opposite the navigation direction, and within the same article as the current page selected for display. Utilizing this dropping criteria, the publishing system 101 would drop pages 3-2 and 3-4 (i.e., pages not in the direction of navigation, opposite the navigation direction, or in the same article) but leave page 2-2 prepare for display (i.e., a page within two pages of the current page selected for display in the direction opposite the navigation direction).

Moreover, in other embodiments, the publishing system 101 drops all pages not identified as pages to prepare for display. In particular, in some embodiments, the publishing system 101 can compare the pages identified to be prepared for display with the set of pages previously prepared for display and drop the pages previously prepared for display that are not within the pages identified to be prepared for display. Thus, with regard to FIG. 8B, in such embodiments, the publishing system 101 can drop pages 2-2, 3-2, and 3-4 (i.e., pages that do not satisfy the display criteria).

Figure 9:
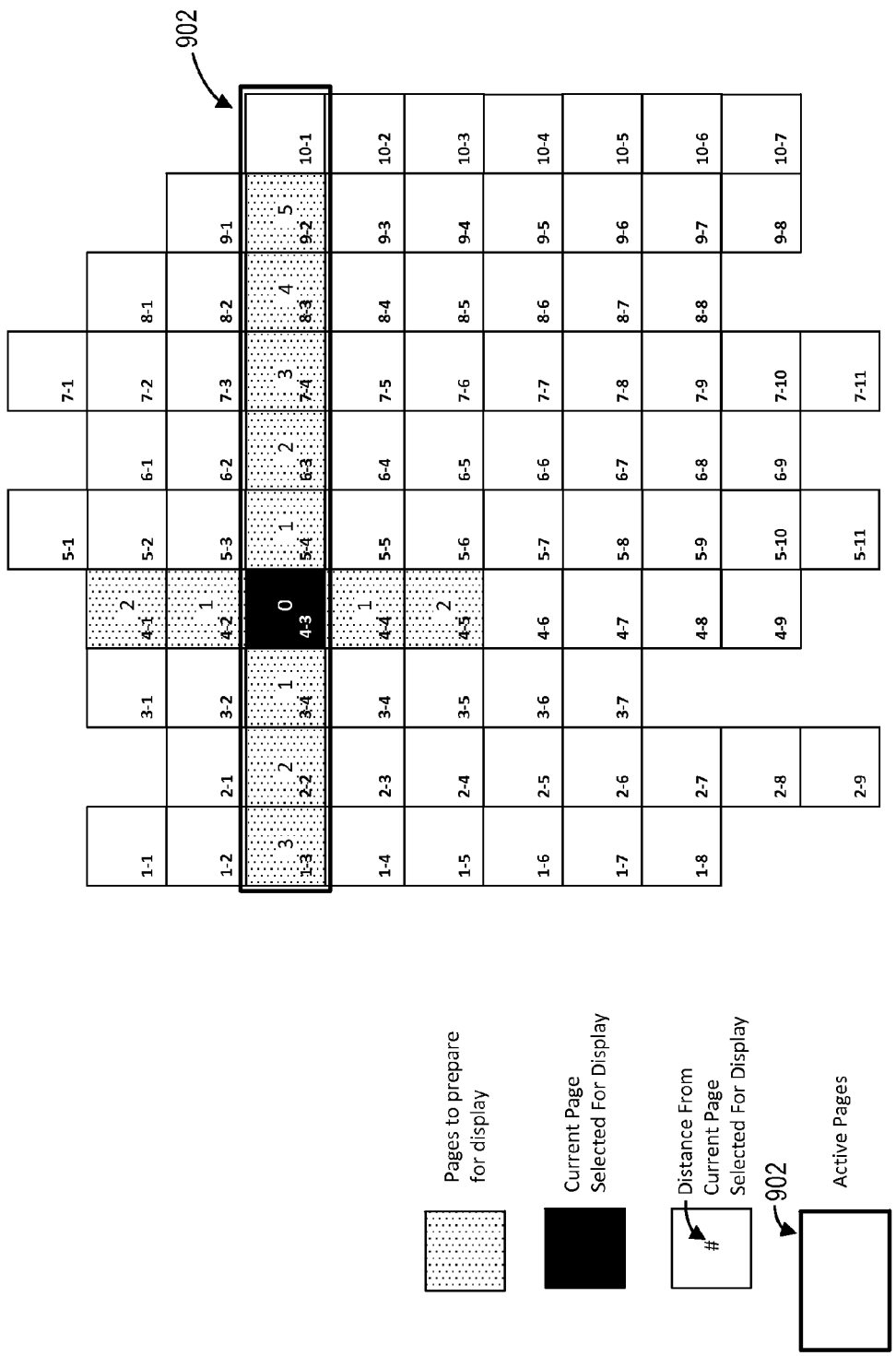
FIG. 9 illustrates a representation of a current page selected for display from a plurality of pages and a plurality of articles and a set of pages to prepare for display in accordance with one or more embodiments.

Although FIGS. 3A to 8B have illustrated one or more embodiments of the publishing system 101 with respect to a particular collection of articles, it will be recognized that the publishing system 101 can operate with regard to any variety of electronic documents with any variety of pages, articles, chapters, collections, or other categories. FIG. 9 illustrates a more robust collection of articles according to one or more embodiments of the publishing system 101. In particular, FIG. 9 illustrates a plurality of pages in a collection of articles. The publishing system 101 identifies active pages 902, indicating the last page selected for display within each article. The publishing system 101 detects navigation information, specifically, a navigation direction from page 3-4 to page 4-3. Based on the navigation information, the publishing system 101 establishes the following display criteria: prepare for display all pages within five pages of the current page selected for display in the navigation direction (i.e., five pages to the right), within two pages of the current page selected for display in the direction opposite the navigation direction (e.g., two pages to the left), or within two pages of the current page selected for display in the same article (e.g., two pages up or down). The publishing system 101 identifies pages 2-2, 3-4, 4-1, 4-2, 4-3, 4-4, 4-5, 5-4, 6-3, 7-4, 8-3, and 9-2 as satisfying the display criteria and identifies those pages to prepare for display.

Figure 10:
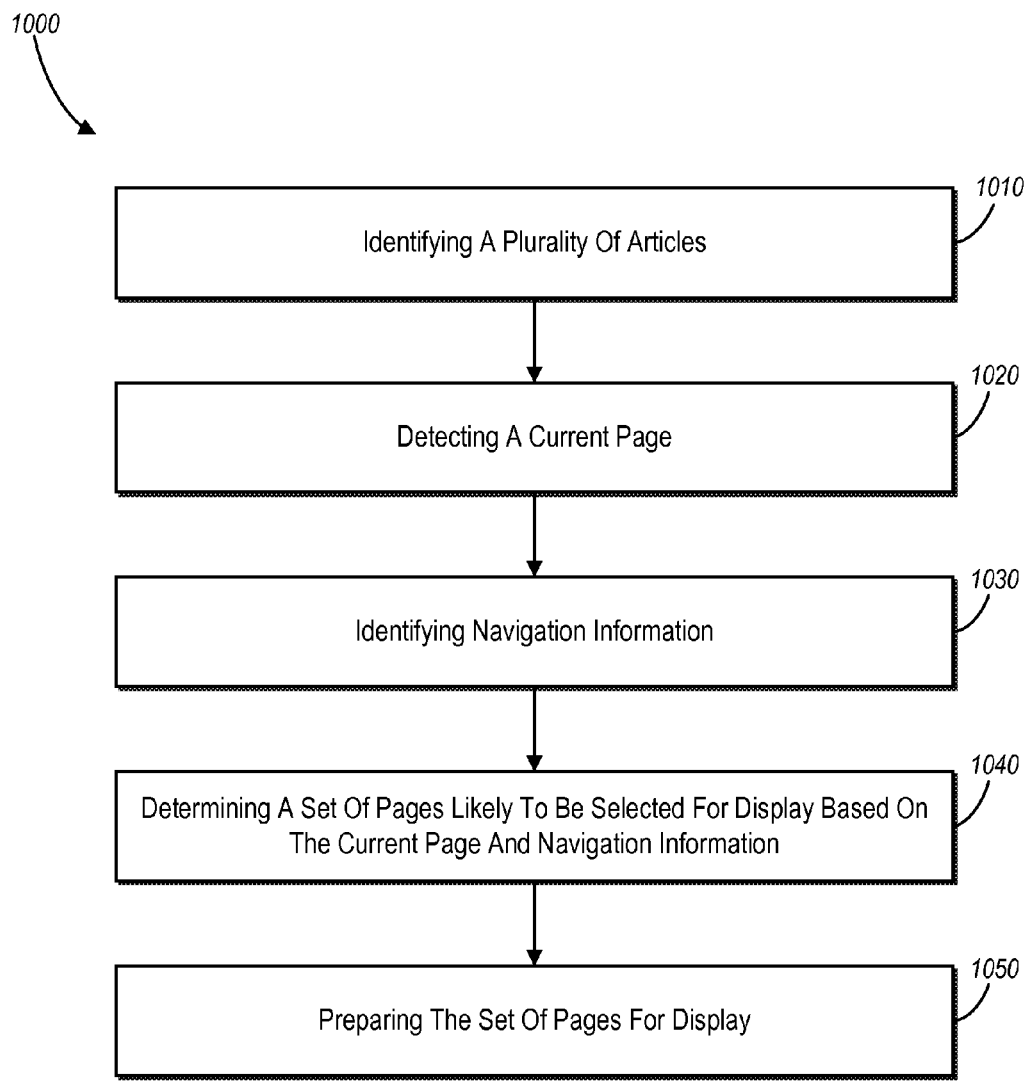
FIG. 10 illustrates a flowchart of a series of acts in a method of publishing electronic documents in accordance with one or more embodiments.
Figure 11:
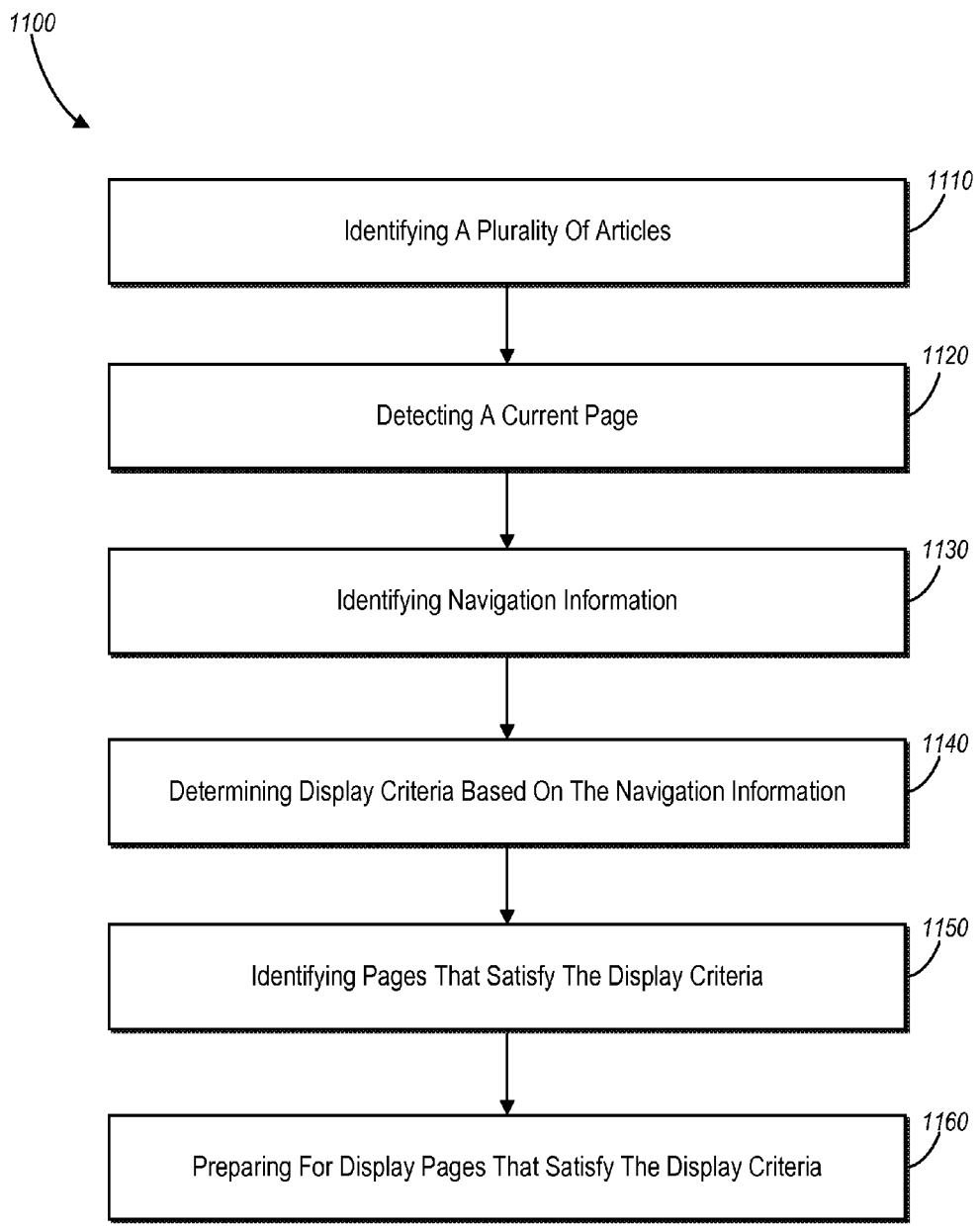
FIG. 11 illustrates a flowchart of a series of acts in a method of publishing electronic documents in accordance with one or more embodiments.

FIGS. 1-9, the corresponding text, and the examples, provide a number of different systems and devices that allows a user to facilitate publishing of one or more electronic documents. In addition to the foregoing, embodiments can also be described in terms of flowcharts comprising acts and steps in a method for accomplishing a particular result. For example, FIGS. 10 and 11 illustrate flowcharts of exemplary methods in accordance with one or more embodiments of the present invention. The methods described in relation to FIGS. 10 and 11 may be performed with less or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart of a series of acts in a method 1000 of publishing one or more electronic documents in accordance with one or more embodiments of the present invention. In one or more embodiments, the method 1000 is performed in a digital medium environment that includes the publishing system 101. The method 1000 is intended to be illustrative of one or more methods in accordance with the present disclosure, and is not intended to limit potential embodiments. Alternative embodiments can include additional, fewer, or different steps than those articulated in FIG. 10.

The method 1000 includes an act 1020 of identifying a plurality of articles. For instance, the act 1020 may include identifying, from a collection of articles, a plurality of articles stored on a client device, the plurality of articles collectively comprising a plurality of pages. The act 1020 may also include receiving a plurality of articles.

As illustrated in FIG. 10, the method 1000 also includes an act 1020 of detecting a current page. In particular, the act 1020 may include detecting a current page selected for display from a first article. In one or more embodiments the act 1020 also includes detecting multiple current pages selected for display from an article. Moreover, the act 1020 may also include detecting multiple current pages selected from display from multiple articles.

As shown in FIG. 10, the method 1000 also includes an act 1030 of identifying navigation information. In one or more embodiments, act 1030 includes identifying navigation information associated with browsing of the collection of articles. For example, the act 1030 can include detecting a navigation direction, detecting a navigation rate, identifying a page from the plurality of pages selected for display prior to the current page, identifying data regarding how one or more users have previously navigated the plurality of pages or any other navigation information described herein.

The method 1000, as shown in FIG. 10, also includes an act 1040 of determining a set of pages likely to be selected for display based on the current page and navigation information. In particular, the act 1040 may include determining a set of pages likely to be selected for display based on a detected current page selected for display and navigation information, the set of pages likely to be selected for display comprising pages from a first article and a subset of pages from each of one or more additional articles. The act 1040 may include calculating a distance between a current page selected for display and each page in a group of pages from the plurality of pages; identifying display criteria based on navigation information, the display criteria comprising one or more distances from the current page; and/or determining the set of pages likely to be selected for display by identifying each page from the group of pages that satisfies the display criteria. In addition, in one or more embodiments, the act 1050 also includes determining navigation routes with regard to a group of pages; and calculating a distance along the navigation routes between the current page and each page in the group of pages. For example, the navigation routes may comprise a route from a current page selected for display in a first article to a second page in a second article or a route from a first page to a second page via a link on the first page.

The method 1000 may also include an act 1050 of preparing the set of pages for display. In particular, the act 1050 may include preparing for display on a client device a determined set of pages likely to be selected for display. In one or more embodiments, the act 1050 also includes calculating, based on navigation information and a current page selected for display, a priority order for a determined set of pages likely to be selected for display; and/or preparing for display each page in the determined set of pages likely to be selected for display according to the priority order. Furthermore, the act 1050 may include identifying a set of pages previously prepared for display and/or dropping one or more pages from the set of previously prepared pages that are not in the determined set of pages likely to be selected for display. Moreover, the act 1050 may include, based on navigation information, leaving at least one page prepared for display from a set of previously loaded pages that is not in a determined set of pages likely to be selected for display.

In addition, in one or more embodiments, the method 1000 may also include updating pages selected for display based on navigation to a new current page selected for display. For example, the method 1000 may include detecting that a user has navigated to a new current page selected for display; determining new navigation routes; identifying new display criteria based on the navigation information, the current page, and the new current page; and/or identifying pages that satisfy the display criteria. Similarly, the method 1000 may include preparing pages that satisfy the display criteria for display.

FIG. 11 illustrates a flowchart of a series of acts in another method 1100 of facilitating electronic communication with a content enhancement in accordance with one or more embodiments of the present invention. Similar to method 1000, the method 1100 also includes an act 1110 of identifying a plurality of articles; an act 1120 of detecting a current page; and an act 1130 of identifying navigation information.

As illustrated in FIG. 11, the method 1100 also includes an act 1140 of determining display criteria based on the navigation information. For instance, in one or more embodiments, the act 1140 includes determining display criteria for a subset of pages from one or more of a plurality of articles, the display criteria comprising a minimum distance from a current page selected for display. As described in more detail above, navigation information may include navigation direction; navigation rate; a page from the plurality of pages selected for display prior to the current page; information regarding the contents of a page; and data regarding how one or more users have previously navigated the plurality of pages.

The method 1100 also includes, as shown in FIG. 11, an act 1150 of identifying pages that satisfy the display criteria. For instance, the act 1150 may also include identifying pages from the subset of pages that satisfy the display criteria. In one or more embodiments, the act 1150 includes determining navigation routes with regard to a plurality of pages and/or calculating a distance along the navigation routes between a current page selected for display and each page from a subset of pages. Furthermore, the act 1150 may include comparing a calculated distance to a minimum distance.

As shown in FIG. 11, the method 1100 also includes the act 1160 of preparing for display pages that satisfy the display criteria. For instance, the act 1160 may include preparing for display on a client device each page that satisfies the display criteria.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
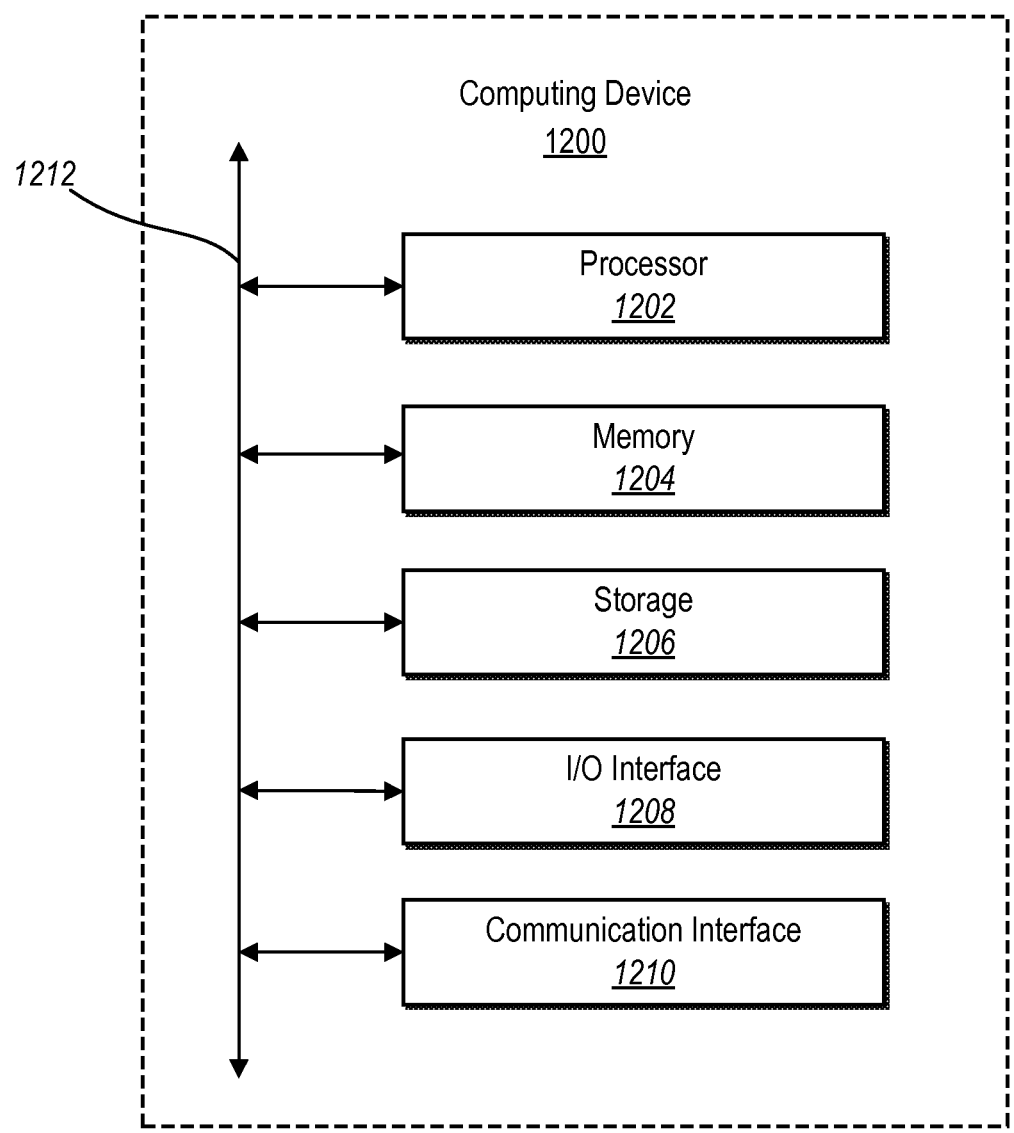
FIG. 12 illustrates a block diagram of an exemplary computing device in accordance with one or more embodiments.

FIG. 12 illustrates, in block diagram form, an exemplary computing device 1100 that may be configured to perform one or more of the processes described above. One will appreciate that the policy selection system 100 can comprise implementations of the computing device 1200. As shown by FIG. 12, the computing device can comprise a processor 1202, memory 1204, a storage device 1206, an I/O interface 1208, and a communication interface 1210. While an exemplary computing device 1200 is shown in FIG. 12, the components illustrated in FIG. 12 are not intended to be limiting. Additional or alternative components may be used in other embodiments. Furthermore, in certain embodiments, a computing device 1200 can include fewer components than those shown in FIG. 12. Components of computing device 1200 shown in FIG. 12 will now be described in additional detail.

In particular embodiments, processor(s) 1202 includes hardware for executing instructions, such as those making up a computer program. As an example and not by way of limitation, to execute instructions, processor(s) 1202 may retrieve (or fetch) the instructions from an internal register, an internal cache, memory 1204, or a storage device 1206 and decode and execute them. In particular embodiments, processor(s) 1202 may include one or more internal caches for data, instructions, or addresses. As an example and not by way of limitation, processor(s) 1202 may include one or more instruction caches, one or more data caches, and one or more translation lookaside buffers (TLBs). Instructions in the instruction caches may be copies of instructions in memory 1204 or storage 1206.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example and not by way of limitation, storage device 1206 can comprise a non-transitory storage medium described above. The storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to the computing device 1200. In particular embodiments, storage device 1206 is non-volatile, solid-state memory. In particular embodiments, storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a stylus or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1210. As an example and not by way of limitation, computing device 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1200 may include any suitable communication interface 1210 for any of these networks, where appropriate.

The computing device 1200 can further include a bus 1212. The bus 1212 can comprise hardware, software, or both that couples components of computing device 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for publishing electronic documents, a method of efficiently processing and displaying digital article collections, comprising:
   identifying a collection of articles, collectively comprising a plurality of pages;
   determining navigation routes corresponding to a current page selected for display from a first article of the collection of articles by a client device of a user;
   identifying navigation information associated with browsing the collection of articles, the navigation information comprising a navigation direction and a navigation rate; and
   determining, by at least one processor, a set of pages to prepare for display from the plurality of pages based on the current page selected for display, the navigation information, and the navigation routes, by:
   determining a first set of display criteria for an active page of a second article in the collection of articles based on the navigation information;
   determining a second set of display criteria for an additional page of the first article based on the navigation information;
   calculating distances along the navigation routes from the current page; and
   determining the set of pages to prepare for display based on the first set of display criteria and the second set of display criteria by comparing the first set of display criteria and the second set of display criteria with the distances along the navigation routes.

2. The method of claim 1, further comprising:
   calculating, based on the navigation information and the current page selected for display, a priority order for the determined set of pages by prioritizing the additional page of the first article relative to the active page of the second article; and
   preparing the determined set of pages for display according to the priority order.

3. The method of claim 1, wherein determining the set of pages to prepare for display comprises determining the first set of display criteria based on a first direction along a navigation route from the current page, the first set of display criteria comprising a first threshold distance based on the first direction.

4. The method of claim 3, wherein determining the set of pages to prepare for display comprises determining the second set of display criteria based on a second direction along an active page navigation route from the current page, the active page navigation route comprising a plurality of active pages from the collection of articles and the second set of display criteria comprising a second threshold distance based on the second direction.

5. The method of claim 4, wherein determining the set of pages to prepare for display comprises determining a third set of display criteria for one or more pages based on the navigation information.

6. The method of claim 5, wherein the third set of display criteria comprises a third threshold distance based on the third direction.

7. The method of claim 5, wherein the first direction comprises the navigation direction, the third direction comprises a direction opposite the navigation direction, and the second direction is different than the first direction and the third direction.

8. The method of claim 5, wherein the third direction is along a second active page navigation route, and the second active page navigation route comprises a second plurality of active pages from the collection of articles.

9. The method of claim 4, where the first threshold distance based on the first direction is greater than the second threshold distance based on the second direction.

10. The method of claim 1, further comprising determining the first set of display criteria based on characteristics of the client device.

11. The method of claim 1, further comprising detecting the active page by determining a last page previously provided for display in the second article.

12. The method of claim 1, wherein identifying the navigation information comprises identifying how the user previously navigated a second plurality of pages; and
determining the set of pages to prepare for display based on how the user previously navigated the second plurality of pages.

13. The method of claim 1, wherein identifying the navigation information comprises identifying how one or more users have previously navigated the plurality of pages; and
determining the set of pages to prepare for display based on how the one or more users have previously navigated the plurality of pages.

14. A non-transitory computer readable medium storing instructions thereon that, when executed by at least one processor, cause a computer system to:
identify a collection of articles collectively comprising a plurality of pages;
detect a current page selected for display from a first article via a client device of a user;
identify navigation information associated with browsing of the collection of articles;
determine, for a first page from the plurality of pages, a first threshold distance from the current page selected for display based on the navigation information and a size of the first page;
determine, for a second page from the plurality of pages, a second threshold distance from the current page selected for display based on the navigation information and a size of the second page, wherein the first threshold distance is different from the second threshold distance; and
based on a determination that the first page is within the first threshold distance of the current page selected for display and the second page is within the second threshold distance of the current page selected for display prepare the first page and the second page for display on the client device of the user.

15. The non-transitory computer readable medium of claim 14, further comprising instructions that, when executed by the at least one processor, cause the computer system to:
determine that the first page is within the first article and the second page is an active page within a second article; and
determine the first threshold distance and the second threshold distance based on the determination that the first page is within the first article and the second page is the active page within the second article.

16. The non-transitory computer readable medium of claim 15, wherein the size of the first page comprises a storage size corresponding to contents of the first page.

17. The non-transitory computer readable medium of claim 14 wherein the navigation information comprises at least one of the following: navigation direction; navigation rate; a page from the plurality of pages selected for display prior to the current page; contents of a page; and data regarding how one or more users have previously navigated the plurality of pages.

18. A system for efficiently identifying content to display from digital article collections, comprising:
at least one processor;
at least one non-transitory computer readable storage medium storing instructions thereon, that, when executed by the at least one processor, cause the system to:
identify a collection of articles comprising a plurality of pages;
determine navigation routes corresponding to a current page selected for display from a first article of the collection of articles by a client device of a user;
identify navigation information associated with browsing the collection of articles; and
determine a set of pages to prepare for display from the plurality of pages based on the current page selected for display, the navigation information, and the navigation routes by:
determining a first set of display criteria for an active page of a second article in the collection of articles based on the navigation information;
determining a second set of display criteria for an additional page of the first article based on the navigation information; and
calculating distances along the navigation routes from the current page; and
determining the set of pages to prepare for display based on the first set of display criteria and the second set of display criteria by comparing the first set of display criteria and the second set of display criteria with the distances along the navigation routes.

19. The system of claim 18, further comprising instructions thereon that when executed by the at least one processor, cause the system to:
determine, based on the navigation information and the current page, a priority order for the set of pages; and
prepare the set of pages for display according to the priority order.

20. The system of claim 18, wherein the navigation information comprises at least one of the following: navigation direction; navigation rate; a page from the plurality of pages selected for display prior to the current page selected for display; contents of a page; and data regarding how one or more users have previously navigated the plurality of pages.

\* \* \* \* \*